(12) United States Patent
Kato et al.

(10) Patent No.: US 6,298,962 B1
(45) Date of Patent: Oct. 9, 2001

(54) MEMBER FOR ARM

(75) Inventors: Rentaro Kato; Koji Uchino; Yuichi Ogawa, all of Kasugai; Masaharu Tochigi, Tochigi; Masatoshi Enomoto, Tochigi; Naoki Nishikawa, Tochigi; Noriyuki Iwameji, Tochigi; Naoyuki Kawata, Tochigi, all of (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/267,262

(22) Filed: Mar. 12, 1999

(30) Foreign Application Priority Data

Mar. 13, 1998 (JP) .................................. 10-063161
Mar. 20, 1998 (JP) .................................. 10-072591
Mar. 24, 1998 (JP) .................................. 10-075883

(51) Int. Cl.$^7$ ........................................ B60G 7/00
(52) U.S. Cl. ......................... 188/371; 188/321.11
(58) Field of Search ......................... 188/371–377, 188/321.11; 403/2; 280/777, 784, 805, 124.134, 124.151; 74/492; 296/188, 189; 267/141, 152, 153, 220; 297/472, 421; 293/133

(56) References Cited

U.S. PATENT DOCUMENTS

| | | | |
|---|---|---|---|
| 3,899,047 | * | 8/1975 | Maeda et al. ................ 188/371 |
| 4,016,950 | * | 4/1977 | Allison . |
| 4,334,693 | * | 6/1982 | Huber . |
| 5,092,017 | * | 3/1992 | Hatano et al. . |
| 5,152,578 | * | 10/1992 | Kiguchi . |
| 5,607,177 | * | 3/1997 | Kato .................................. 188/377 |
| 5,845,938 | * | 12/1998 | Kato .................................. 280/784 |
| 6,007,058 | * | 12/1999 | Kokubo et al. . |
| 6,099,078 | * | 8/2000 | Smithson et al. ............... 297/472 |

FOREIGN PATENT DOCUMENTS

| | | |
|---|---|---|
| 28 45 345 A1 | 10/1978 | (DE) . |
| 41 42 587 A1 | 12/1991 | (DE) . |
| 6298121 | * 10/1994 | (JP) . |
| 1120434 | * 1/1999 | (JP) . |
| 11254932 | * 9/1999 | (JP) . |

OTHER PUBLICATIONS

German Office Action in corresponding German patent application.

* cited by examiner

Primary Examiner—Douglas C. Butler

(57) ABSTRACT

There is disclosed a member for use with an arm that is used as an automobile suspension arm, for example. The member comprises a rodlike body and bushing-mounting portions formed at both ends of the rodlike body. The rodlike body consists of a hollow tube fabricated by extruding an aluminum material into a circular cross section. The bushing-mounting portions are formed by welding bushing-mounting members to both ends of the rodlike body. Each bushing-mounting member has a hole in which a bushing is mounted with a press fit. The curved wall of the rodlike body is recessed at the longitudinal center of the rodlike body. When an automobile having the aforementioned member collides, an axial compressive load is applied to the rodlike body. The rodlike body buckles at the recessed portion. This mitigates the impact in the collision.

25 Claims, 18 Drawing Sheets

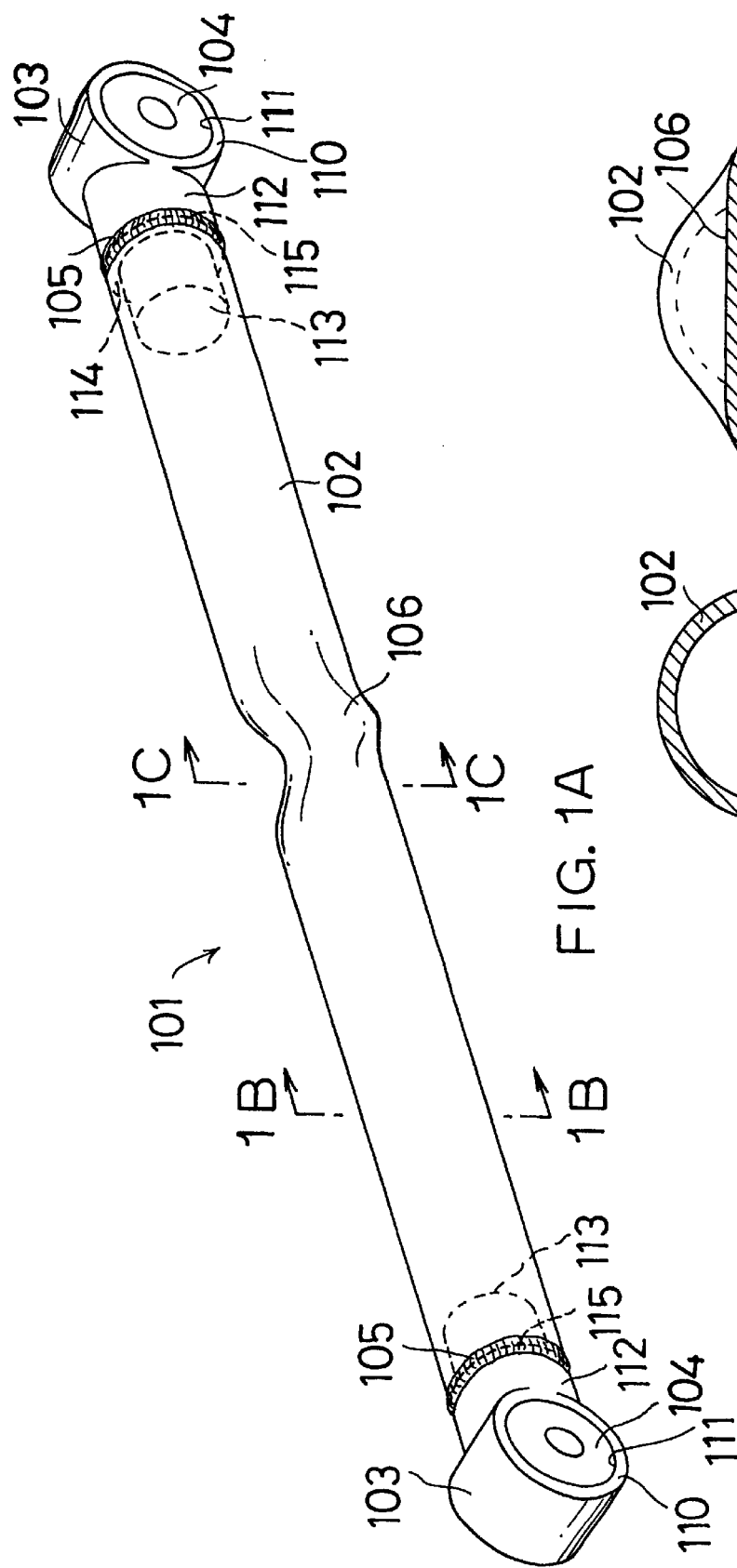

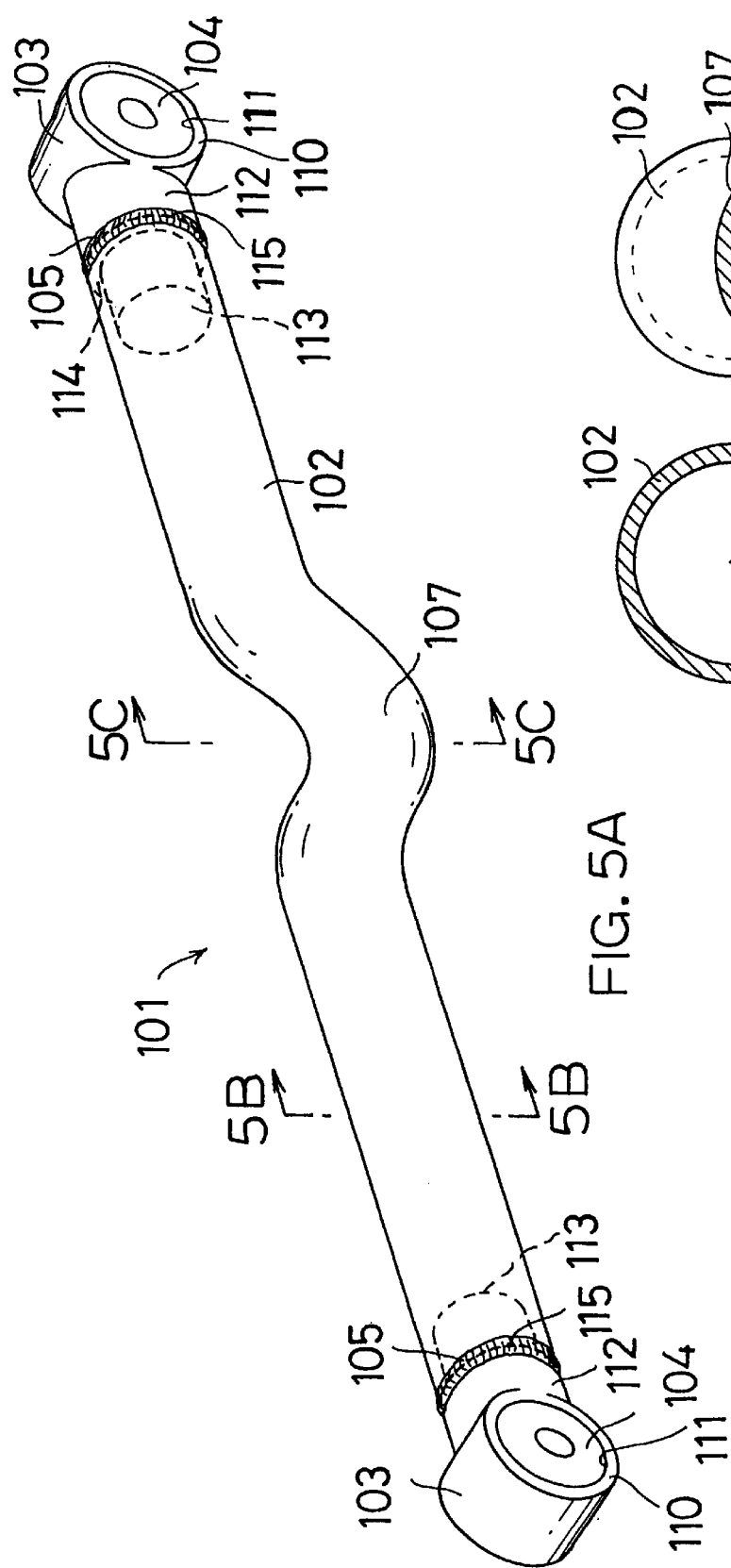
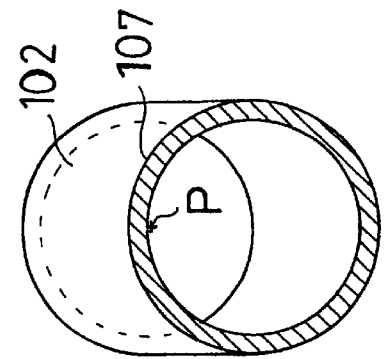
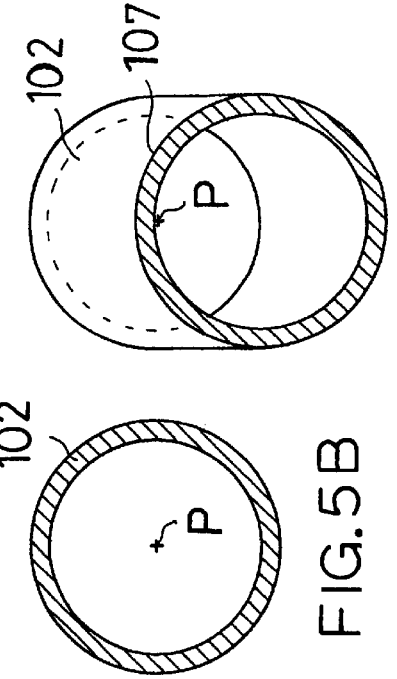
FIG. 5A
FIG. 5B
FIG. 5C

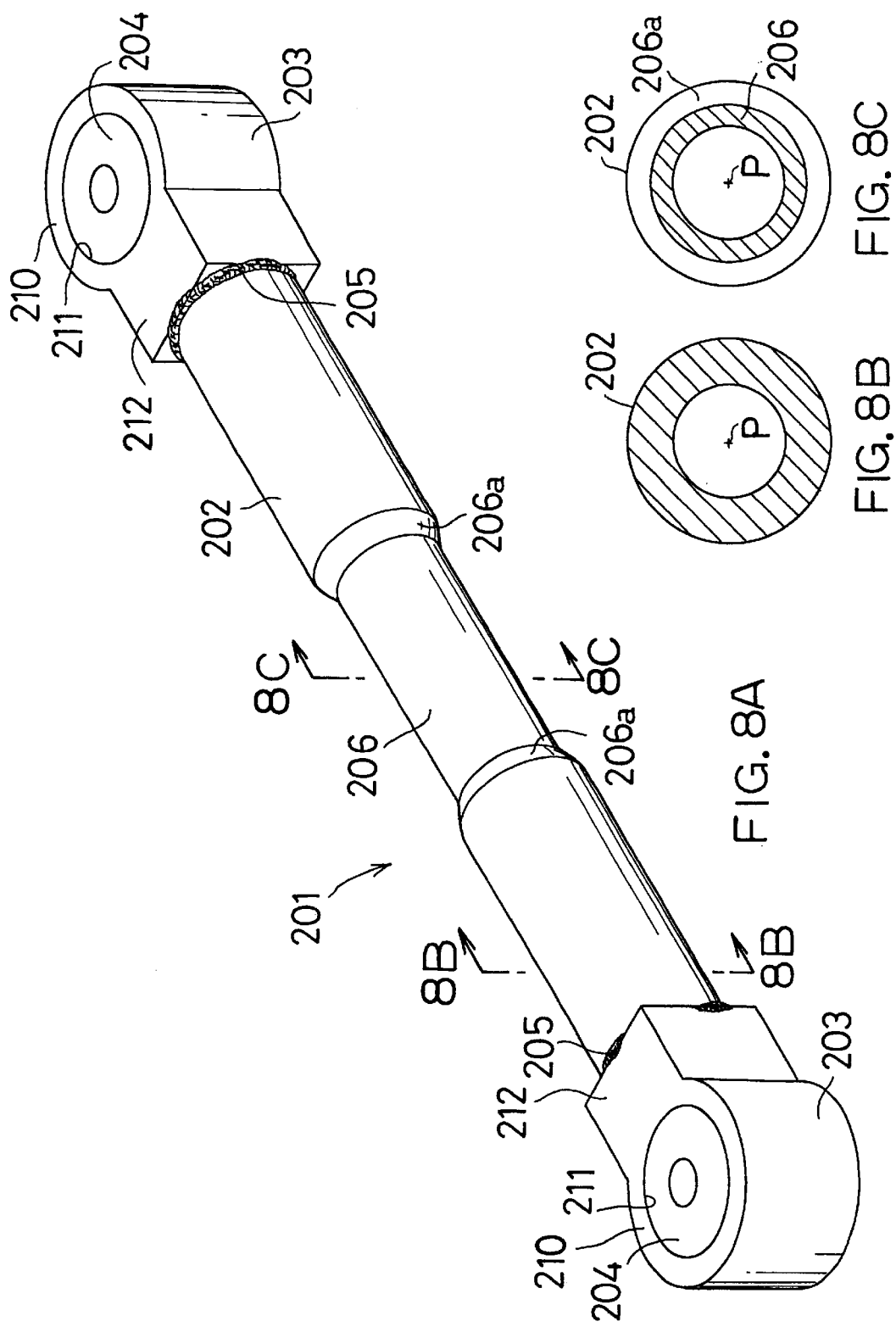

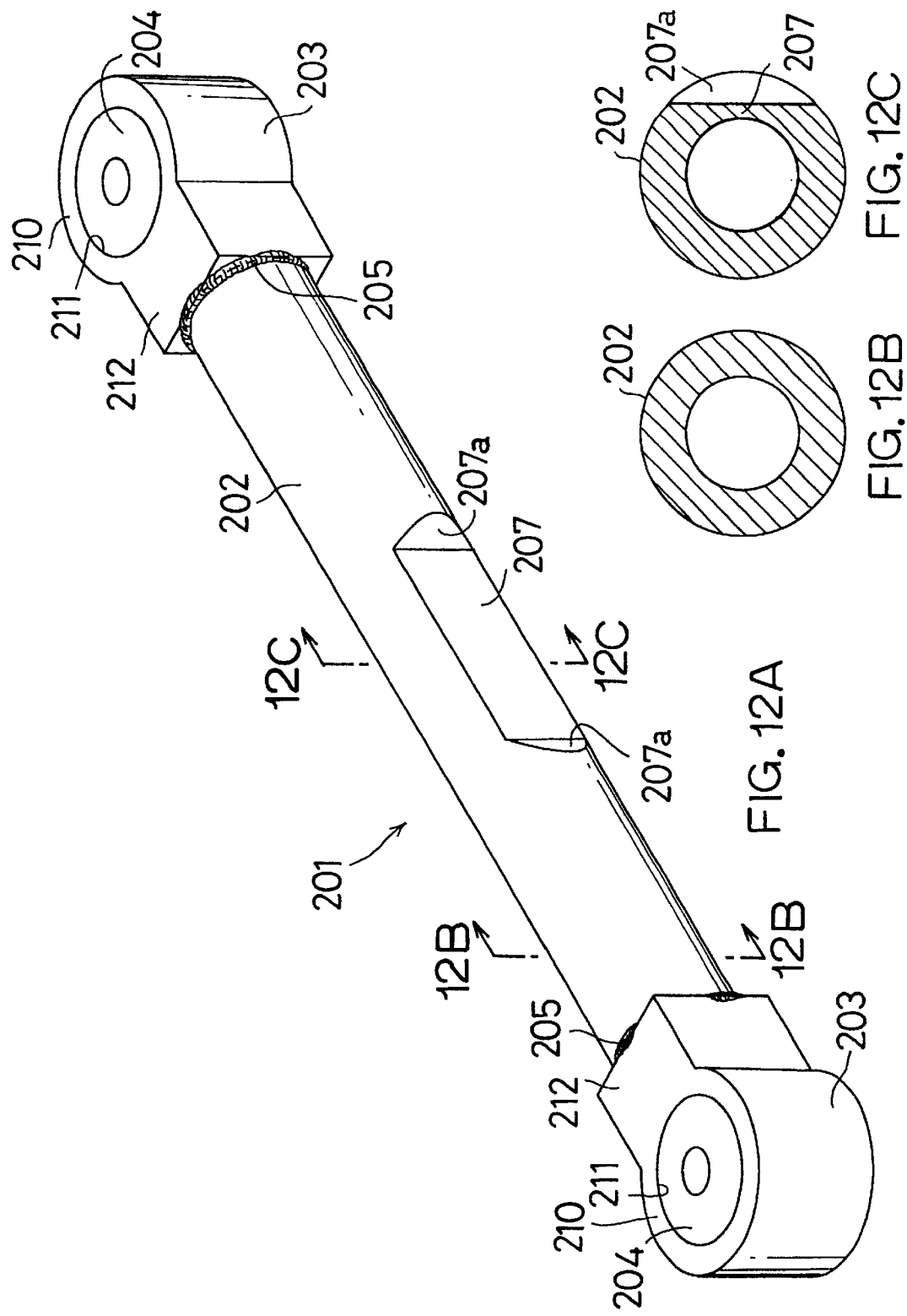

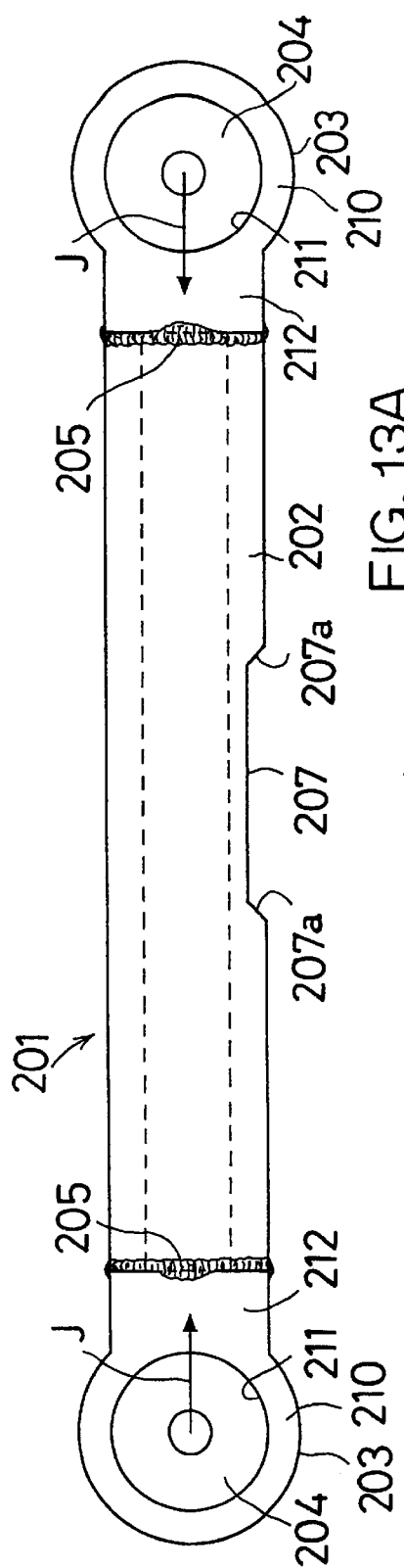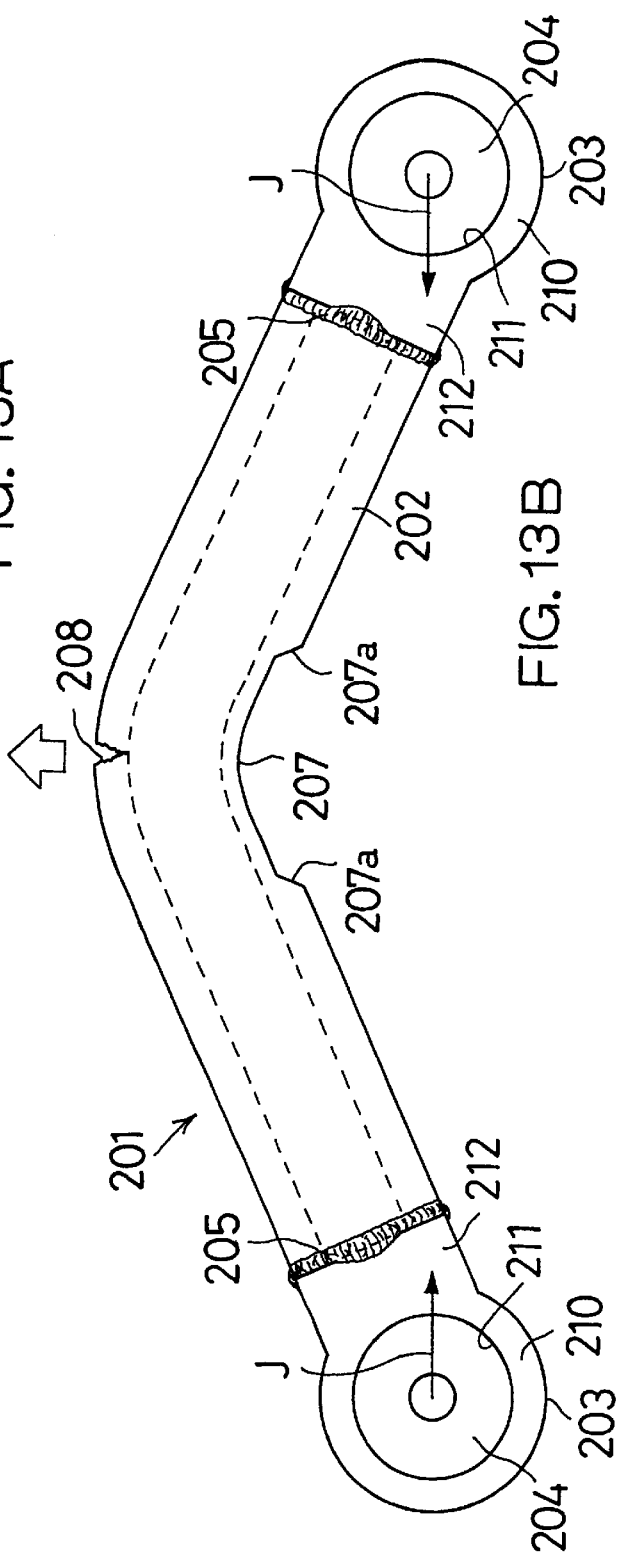
FIG. 13A
FIG. 13B

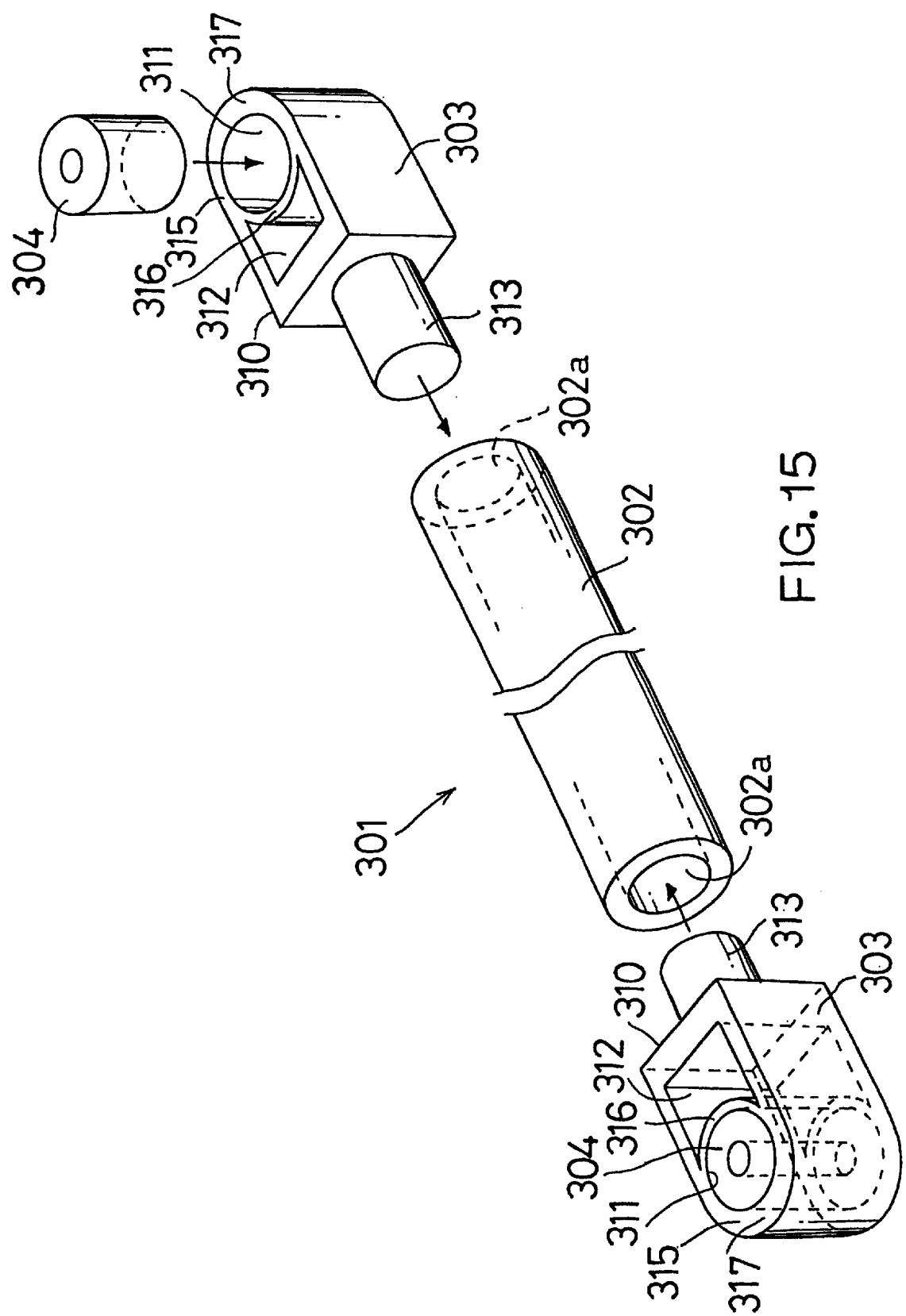

MEMBER FOR ARM

BACKGROUND OF THE INVENTION

1. Field of the Invention

The present invention relates to a member for use with an arm used as an automotive suspension arm, an engine mount, a link, a frame, and so on.

2. Description of the Related Art

For example, a member for use with an arm such as an upper arm, a lower arm, a trailing arm, or a torsion bar is mounted in an automobile. Such a member for use with an arm is generally composed of a metallic rodlike body and joints formed at both ends of the rodlike body. The joints are connected to other automotive members. One example of these joints is a bushing mount having bushing-holding hole in which a bushing is fitly held. Other examples include a yoke and a ball joint.

A method of mounting this member for use with an arm to other automotive member is described by taking an example in which the aforementioned joint is the above-described bushing mount. The bushing-holding hole in the bushing mount is shaped circularly. A cylindrical anti-vibration bushing including a rubber elastic member is fitly held in the hole. The member for the arm is mounted to the other automotive member via this bushing.

Such members for arms come in various kinds. When a collision takes place, some of them are required to deform so as to mitigate the impact if a load of more than a given value is applied.

In particular, when an automobile crashes, a load is applied to the bushing in the direction to bring the bushing and the member closer to each other it follows that an axial compressive load is applied to the member for the arm. The member for the arm receives the axial compressive load and is required to deform, so that the member can mitigate the impact in the crash.

SUMMARY OF THE INVENTION

In view of the technical background as described above, the present invention has been made.

It is an object of the present invention to provide a member for use with an arm capable of mitigating impact in a collision.

Other objects and features of the invention will appear in the course of the description thereof, which follows.

The above-described object is achieved in accordance with the teachings of the invention by a member or use with an arm, the member comprising a rodlike body made of a metal. Joints are formed in parts of the rodlike body. This member has a deformable portion that permits the member to deform easily when an axial compressive load is applied.

In particular, when an automobile or any other vehicle having the arm mounted therein crashes, an axial compressive load is applied to the member for use with the arm. Since the member in accordance with the invention has the deformable portion that facilitates deformation of the member when the axial compressive load is applied. Therefore, when the vehicle collides, the axial compressive load deforms the member for the arm in the deformable portion. This deformation mitigates the impact in a crash.

An example of the deformable portion is a crushed wall portion of the rodlike body formed in a longitudinally intermediate portion of the rodlike body of the member. In this case, the axial compressive load buckles the rodlike body of the arm in the crushed wall portion. This buckling mitigates the impact in a crash.

Where the rodlike body of the members consists of a hollow tubular member and the deformable portion described above is a recessed curved wall portion of the hollow tubular member locally formed in a longitudinally intermediate portion of the rodlike body, an axial compressive load buckles the rodlike body of the member in the recessed portion, in the same way as in the above-described case. Thus buckling reduces the impact in a collision. Furthermore, the member for use with the arm is made lightweight, because the rodlike body is a hollow tubular member.

Where the hollow tubular member is of circular cross section, dead space is unlikely to be produced. This enhances the space factor.

Where the hollow tubular member is fabricated by extrusion, the rodlike body of the member can be fabricated efficiently and economically.

Where the aforementioned deformable portion is an axially offset portion locally formed in a longitudinally intermediate portion of the rodlike body of the member, an axial compressive load buckles the rodlike body of the member in the axially offset portion, in the same way as the foregoing. This buckling mitigates the impact in a crash.

The aforementioned crushed wall portion, the recessed portion of the curved wall of the hollow tubular member, and the axially offset portion are formed by plastic working processes such as press working, electromagnetic forming, and spinning, since plastic working processes can form such parts in such a way that the horizontal cross-sectional area is little reduced. That is, a plastic working process has the advantage that it can reduce buckling load while minimizing the decrease in the tensile strength in the body of the member for use with an arm.

Where the deformable portion described above is a thin-walled portion locally formed in a longitudinally intermediate portion of the body of the member, an axial compressive load buckles the body of the member for use with the arm in the thin-walled portion in the same way as the foregoing. This buckling mitigates the impact in a crash.

The thin-walled portion is formed by a cutting operation for the following reason. Indeed, the thin-walled portion may be formed in the body of the member by press working. A press working process can reduce buckling load while reducing the decrease in the tensile strength to a minimum as mentioned previously. However, residual stress causes springback and so it is difficult to obtain high dimensional accuracy where a cutting process is used, no springback is induced and so high dimensional accuracy can be derived. Accordingly, it is desired to form the thin-walled portion by a cutting operation, becaue high dimensional accuracy can be obtained. Examples of cutting processes include cutting operations using a cutting tool, such as turning, planing, and milling, and abrasive-machining processes using abrasive grains such as bonded abrasives and loose abrasives.

The thin-walled portion described above may be formed over the whole circumference or in a part of the body of the member in a circumferential direction. In the latter case, the direction of deformation of the body of the member can be set.

Each of the joints can consist of a bushing-mounting portion having a bushing-holding hole in which a bushing is fitly held. The deformable portion described above can be formed near the bushing-holding hole via a partition wall. The bushing fitted in the bushing-holding hole can be a space to permit the bushing to move the partition wall while plastically deforming it. In this case, an axial compressive load moves the bushing into the space while plastically deforming the partition wall. The resulting plastic deformation of the partition wall mitigates the impact in a crash.

Where the partition wall is made thinner than the other part of the curved wall around the bushing-holding hole, the partition wall easily deforms plastically. This assures that impact is mitigated in a collision.

Where a thin-walled portion is formed in a part of the partition wall, the partition wall easily deforms plastically in the same way. This assures mitigation of impact in a crash.

Where the body of the member is made of aluminum or an aluminum alloy, a lightweight member for use with an arm is obtained. Similarly, where the joints are made of aluminum or an aluminum alloy, a lightweight member for use with an arm can be derived.

BRIEF DESCRIPTION OF THE DRAWINGS

FIG. 1A is a perspective view of a member for use with an arm, the member being built in accordance with a first embodiment of the present invention;

FIG. 1B is a cross-sectional view taken on line 1B—1B of FIG. 1A;

FIG. 1C is a cross-sectional view taken on line 1C—1C of FIG. 1A;

FIG. 5A is a perspective view of a member for use with an arm, the member being built in accordance with a second embodiment of the invention;

FIG. 5B is a cross-sectional view taken on line 5B—5B of FIG. 5A;

FIG. 5C is a cross-sectional view taken on line 5C—5C of FIG. 5A;

FIG. 8A is a perspective view of a member for use with an arm, the member being built in accordance with a fourth embodiment of the invention;

FIG. 8B is a cross-sectional view taken on line 8B—8B of FIG. 8A;

FIG. 8C is a cross-sectional view taken on line 8C—8C of FIG. 8A;

FIG. 12A is a perspective view of a member for use with an arm, the member being built in accordance with a fifth embodiment of the invention;

FIG. 12B is a cross-sectional view taken on line 12B—12B of FIG. 12A;

FIG. 12C is a cross-sectional view taken on line 12C—12C of FIG. 12A;

FIG. 13A is a plan view of a member body, and in which the body is not yet deformed;

FIG. 13B is a plan view similar to FIG. 13B, but in which the body is being deformed;

FIG. 15 is a perspective view of a member body, a bushing mount used as a joint, and a bushing;

DESCRIPTION OF THE PREFERRED EMBODIMENTS

Figure 2A:
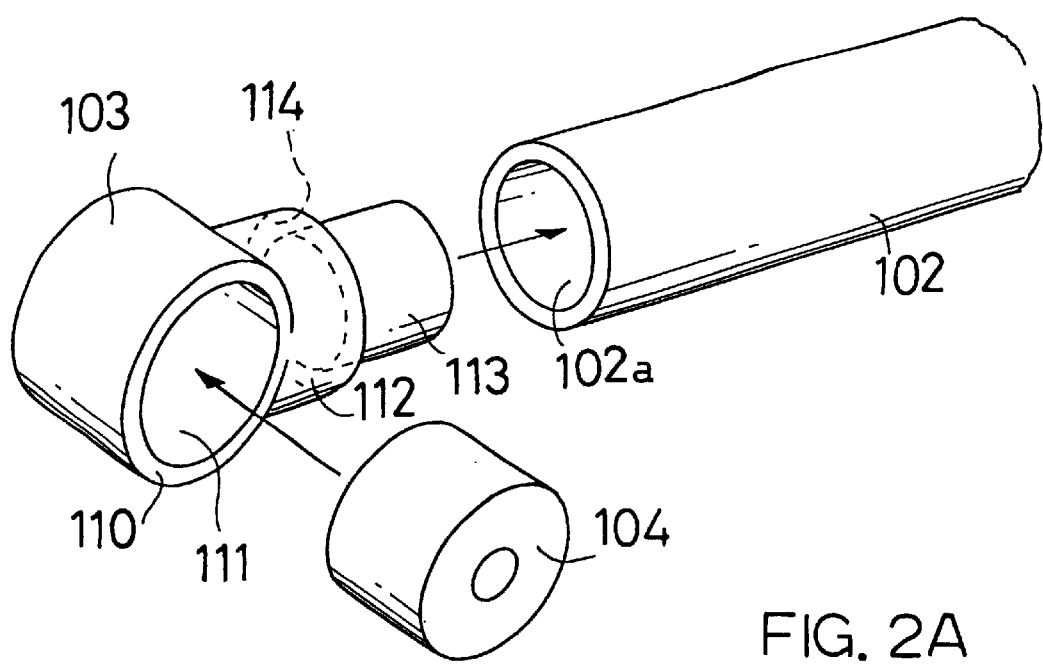
FIG. 2A is a perspective view of a member body, a bushing mount used as a joint, and a bushing.

The preferred embodiments of the present invention are hereinafter described by referring to the drawings. FIGS. 1A–4B illustrate a first embodiment. FIGS. 5A–6B illustrate a second embodiment. FIGS. 7A and 7B illustrate a third embodiment. FIGS. 8A–11 illustrate a fourth embodiment. FIGS. 12A–13B illustrate a fifth embodiment. FIGS. 14–17B illustrate a sixth embodiment. FIG. 18 illustrates a seventh embodiment. In all of these embodiments, the members for the arms are used as automotive suspension arms.

The first embodiment of the present invention is first described by referring to FIGS. 1A–4B. As shown in FIGS. 1A–1C, a member 101 for use with an arm comprises a rodlike body 102 having a given length, a pair of press-fit bushing mounts 110 formed at both ends of the rodlike body 102, and a pair of cylindrical anti-vibration bushings 104. Each bushing 104 includes a rubber elastic member. The bushing mounts 110 are joints connected to other automotive members.

In this first embodiment, the body 102 of the member is separate from the bushing mounts 110. These bushing mounts 110 are formed at both ends of the member body 102 by frictional stir welding bushing-mounting members 102 having the bushing mounts 110, respectively, to both ends of the member body 102. The members for use with an arm 103 are joined to the member body 102 at joints 105.

The body 102 of the member is fabricated by extruding aluminum or an aluminum alloy into a straight hollow pipe of circular cross section and cutting it to a given length along a plane perpendicularly crossing the direction of extrusion, as shown in FIG. 2A. For example, the body 102 has a length of 200 to 600 mm and an outside diameter of 15 to 35 mm. As shown in FIGS. 1A and 1C, a crushed portion 106 is formed in the longitudinal center of the member body 102 by locally plastically deforming the wall of the body 102 into a flat state. This crushed portion 106 is recessed because the curved wall of the hollow pipe is locally crushed into a flat state from a direction perpendicular to the axial direction. The crushed portion 106 forms a deformable portion for facilitating deformation when an axial compressive load is applied.

The bushing-mounting member 103 is die cast from aluminum. As shown in FIG. 2A, this bushing-mounting member comprises integrated parts, i.e., the aforementioned cylindrical bushing mount 110, a cylindrical connecting protrusion 112 protruding from the outer surface of the bushing mount 110, and a cylindrical extension 113 having a diameter smaller than that of the connecting protrusion 112. The bushing mount 110 has a circular bushing-holding hole 111 in which the bushing 104 is mounted with a press fit and held there. The protrusion 112 has a diameter substantially equal to the outside diameter of the member body 102. The cylindrical extension 113 to be fitted into the body 102 protrudes from the center of the end surface of the connecting protrusion 112. The diameter of the cylindrical extension 113 is set slightly larger than the inside diameter of the member body 102 so that the extension 113 can be mounted with a press fit in an opening 102a at one end of the body 102. Indicated by 114 in FIG. 2A is a step between the connecting protrusion 112 and the cylindrical extension 113 fitted into the body.

The member 101 for the arm in accordance with the first embodiment of the invention is described below in connection with a method of fabricating the member 101. As shown in FIG. 2A, the bushing 104 is first mounted with a press fit into the holding hole 111 in the bushing-mounting portion 110 of the bushing-mounting member 103. The connecting extension 113 of the bushing-mounting member 103 is forced into the opening 102a at one end of the member body 102 until the step 114 bears against the end surface of the member body 102. Thus, the outer curved surface of the protrusion 112 is continuous with the outer surface of the member body 102, and this state is maintained.

Figure 2B:
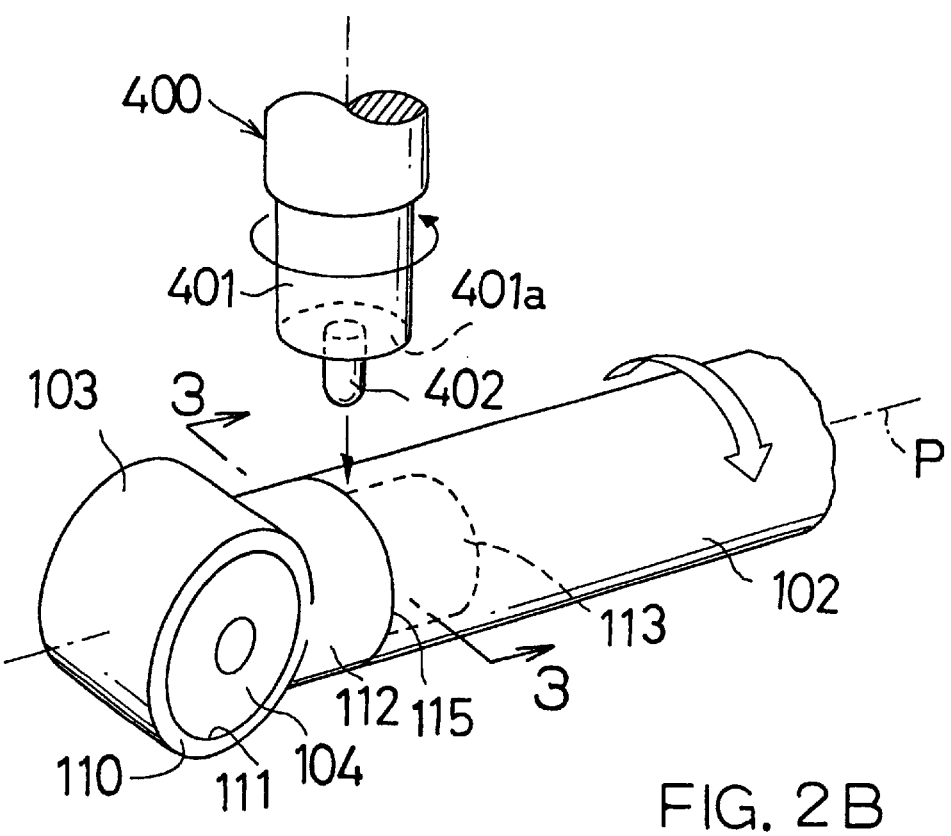
FIG. 2B is a perspective view of a member body, a bushing mount fitted in the member body and a welding tool.

Then, as shown in FIG. 2B, the connecting protrusion 112 of this fitting portion and the abutting end surface 115 of the member body 102 are circumferentially joined together. In this way, the bushing-mounting member 103 and the member body 102 are coupled together. Although this joining operation can be performed by a fusion welding process such as MIG, TIG, or laser welding, it is desired to carry out the joining operation by friction stir welding that is a kind of nonfusion process.

Figure 3:
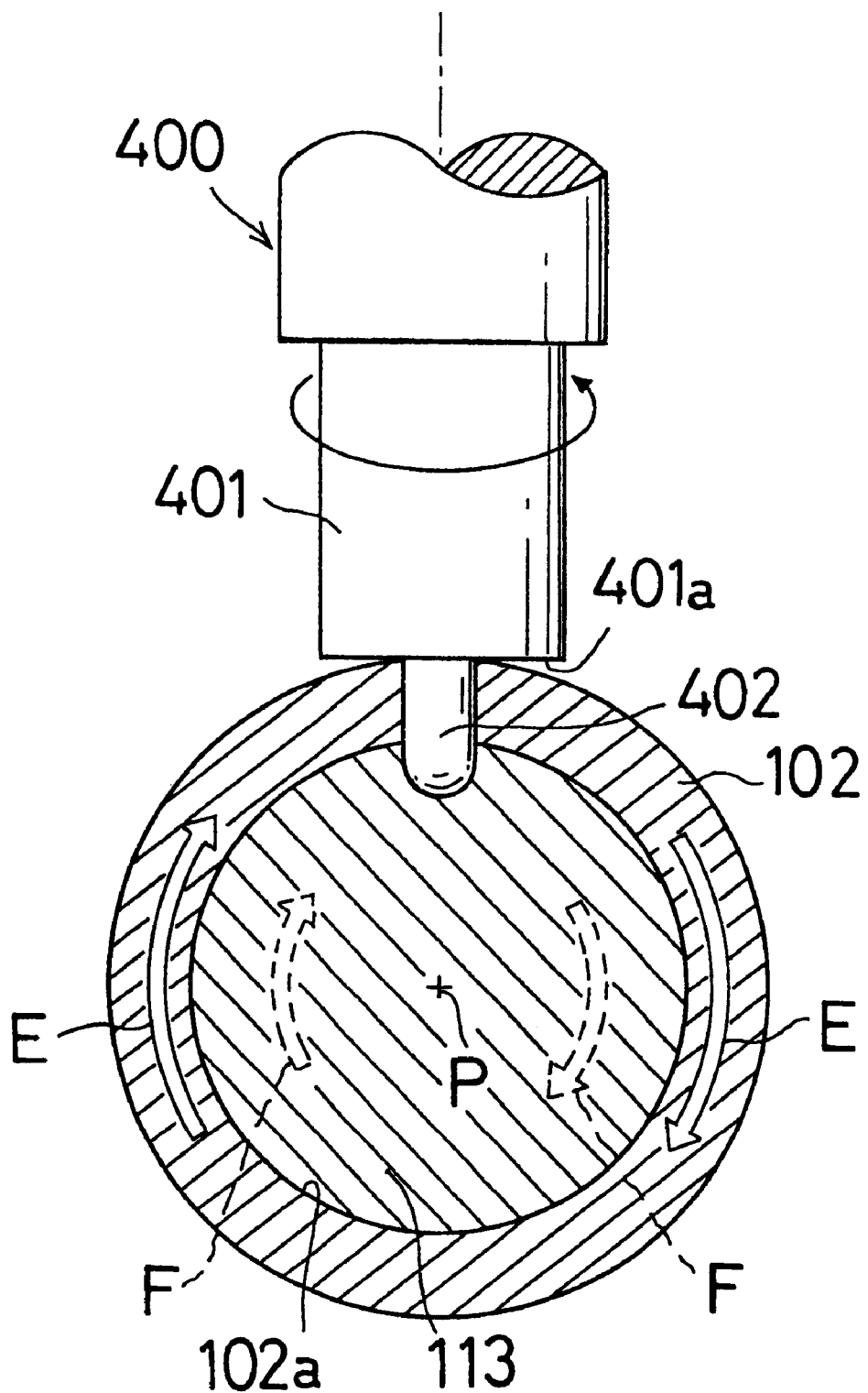
FIG. 3 is a cross-sectional view taken on line 3—3 of FIG. 2B, and in which the probe of the welding tool is inserted in a fitting portion between the member body and the bushing mount.

They are welded together by a friction stir welding process in the manner described below. As shown in FIG. 2B, a reduced pin-like probe 402 is inserted into the abutting portion 115 between the connecting protrusion 112 and the end surface of the member body 102, using a welding tool 400 having an enlarged cylindrical rotor 401 as well as the aforementioned probe 402. This probe 402 protrudes axially from the end surface 401a of the rotor 401 so as to be rotatable with the rotor 401. As shown in FIG. 3, the probe is inserted until the front end of the probe 402 goes beyond the wall thickness of the member body 102 and enters the connecting extension 113 and until the end surface 401a of the rotor 401 bears against the outer surface of the connecting protrusion 112 and against the outer surface of the member body 102, because more frictional heat is produced.

The member body 102 and the bushing-mounting member 103 are rotated as a unit about the axis P of the member body 102. Since the connecting extension 113 of the bushing-mounting member 103 is mounted with a press fit in the opening 102a within the member body 102, if one of the member body 102 and the bushing-mounting member 103 is rotated, the other connected to it rotates with it. Therefore, it is quite easy to perform the rotational operation by rotating either the body 102 or the bushing-mounting member 103.

In this first embodiment, the member body 102 is driven rotationally in the direction indicated by the arrow E as shown in FIG. 3. This rotates the connecting extension 113, i.e., the bushing-mounting member 103, in the direction indicated by the arrow F.

After the probe 402 has been inserted, the member body 102 is rotated so that the abutting portion 115 passes through the probe 402. The abutting portion 115 is circumferentially friction stir welded to weld together the member body 102 and the bushing-mounting member 103. The abutting portion of the end surface 401a of the rotor 401 that is directed in the direction of rotation of the member body 102 is kept pressed against the connecting protrusion 112 and against the member body 102. The portion opposite to the abutting portion is afloat above the surfaces of the connecting protrusion 112 and of the member body 102. Under this condition, if the member body 102 is rotated, more frictional heat is generated. Furthermore, a good joint can be obtained with favorable results.

Figure 4A:
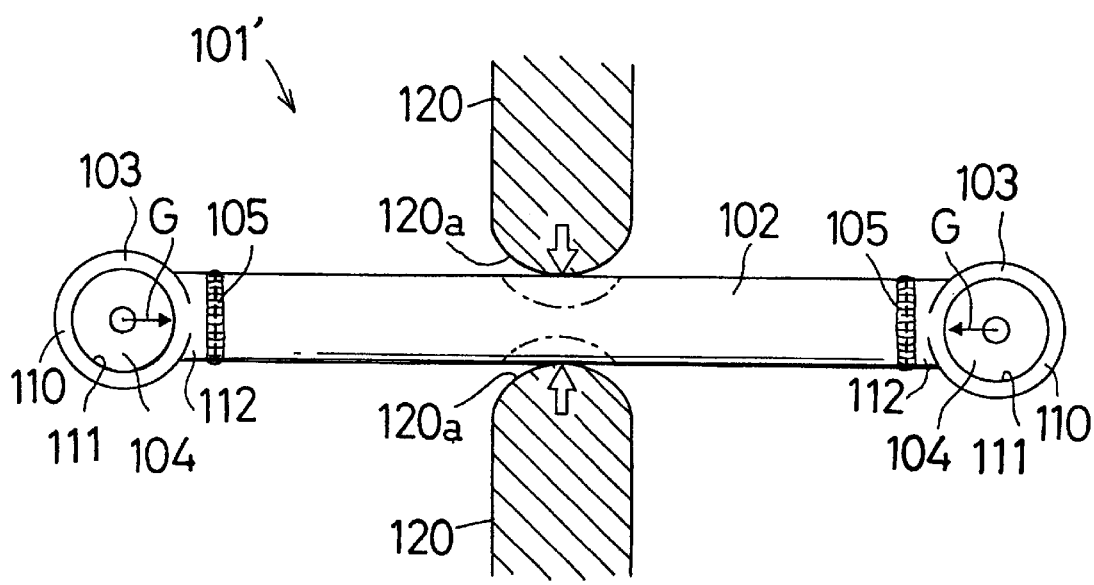
FIG. 4A is a front elevation of a member body, and in which the body is not yet undergone plastic working.

The resulting member for the arm is indicated by 101' in FIG. 4A. In this member 101' for the arm, the bushing mounts 110 are connected to the member body 102 in such a way that the axes of the holding holes 111 in the mounts 110 lie in the same direction and perpendicularly to the axis P of the member body 102. The joint 105 is formed over the whole circumference along the abutting portion 115 between the connecting protrusion 112 and the member body 102.

The body 102 of the member 101' for the arm is made of a hollow tubular member of circular cross section and so this body 102 has high space factor and is lightweight. Since the member body 102 and the bushing-mounting member 103 are made of aluminum, the weight is reduced further. In addition, the member body 102 is fabricated by an extrusion process and so the manufacturing efficiency can be enhanced. The cost can be curtailed greatly. Accordingly, the member 101' for the arm is economical to fabricate.

The member body 102 and the bushing-mounting members 103 are welded together by friction stir welding that needs a much less amount of heat applied than fusion welding processes such as MIG welding, TIG welding, and laser welding. Therefore, the rubber elastic member of the bushing 104 mounted in the holding hole 111 of the bushing mount 110 is hardly affected by heat and so the resilient characteristics of the bushing 104 is maintained well. Furthermore, the joint 105 is neither deteriorated in bond strength nor thermally distorted. Consequently, the bond strength is high, and the bond state is good.

The member 101' for the arm shown in FIG. 4A is mounted to other automotive member via the bushings 104 mounted in the holding holes 111 formed in the bushing mounts 110. If the automobile collides, a load is applied to the bushings 104 in a direction (indicated by the arrow G) to bring them closer to each other. An axial compressive load is applied to the member body 102. However, if the axial compressive load is applied to the member body 102 of the member 101' for the arm, the body 102 is insusceptible to deformation such as buckling. Therefore, it is impossible to mitigate the impact in a collision. Generally, a hollow tubular member used as the body of the member for the arm has a length of 200 to 600 mm and an outside diameter of 15 to 35 mm. The hollow tubular member having these dimensions have a buckling load and a tensile strength that are substantially equal to each other. Therefore, if the buckling load is set low by decreasing the wall thickness of the member body 102, the tensile strength is also reduced. As a result, the member for the arm might be useless.

Accordingly, in this first embodiment, only the curved wall of the hollow tubular member in the longitudinal center of the member body 102 is held between punches 120 having shaping surfaces 120a of given shape from a direction perpendicular to the axis P of the member body 102 and to the axes of the holding holes 111 in the bushing mounts 110. The curved wall is plastically deformed to a horizontal cross-sectional shape that is substantially elliptical such that the decrease in the cross section is minimized, consequently, the opposite wall portions of the curved wall are recessed, forming a local crushed portion 106 in the longitudinal center of the member body 102. The second moment around the cross section about the axis that passes through the center of the horizontal cross section of the curved wall and parallel to the axes of the holding holes 111 in the bushing mounts 110 is smaller than the second moments around the other axes passing through the same center. As a result, the member body 102 can be easily buckled. For example, the body 102 can be folded into two at the crushed portion 106. The area of the horizontal cross section of the crushed portion 106 hardly decreases after plastic working. For this reason, the obtained tensile strength of the member 101 for the arm has hardly decreased and exhibits a value substantially equal to the value obtained prior to the plastic working.

Figure 4B:
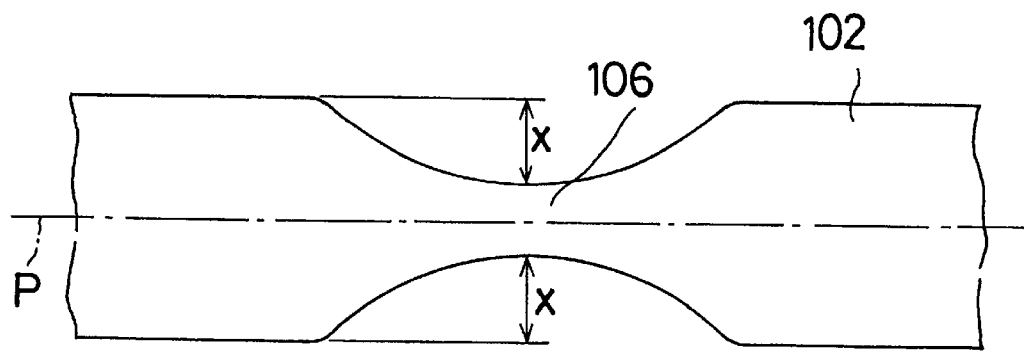
FIG. 4B is an enlarged front elevation of the member body shown in FIG. 4A, and in which the body has undergone plastic working.

The local portion plastically deformed so as to decrease the second moment of the cross section, i.e., the crushed portion 106, is formed in the longitudinal center of the member body 102. Consequently, the member body 102 easily buckles. Therefore, the member 101 for the arm can mitigate the impact in a collision. In FIG. 4B, x indicates the amounts of recession in the curved wall of the member body 102 formed by the pushing force of the punches 120. These amounts of recession x are equal.

A second embodiment of the present invention is next described by referring to FIGS. 5A–6B. Note that like components are indicated by like reference numerals in various figures.

In this second embodiment, the member 101 for the arm has a local bent portion 107 in the longitudinal center of the member body 102 as shown in FIGS. 5A–5C. This bent portion 107 is formed without changing the horizontal cross-sectional area or the dimensions. Thus, a local portion that is offset in axis (P) is formed in longitudinal center of the member body 102. The bent portion 107 is shaped like the letter C.

Figure 6A:
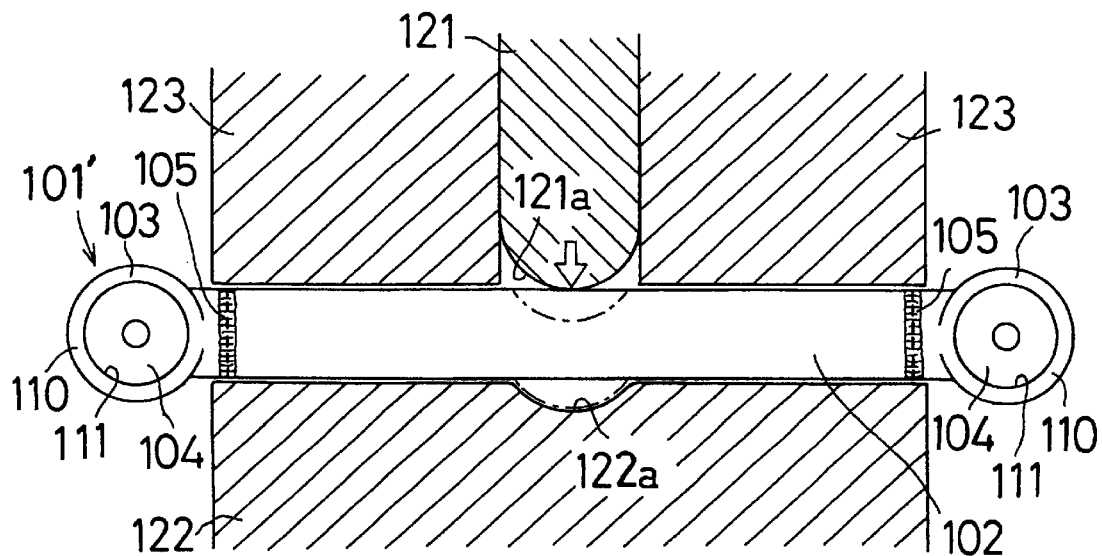
FIG. 6A is a front elevation of a member body not yet undergone plastic working.
Figure 6B:
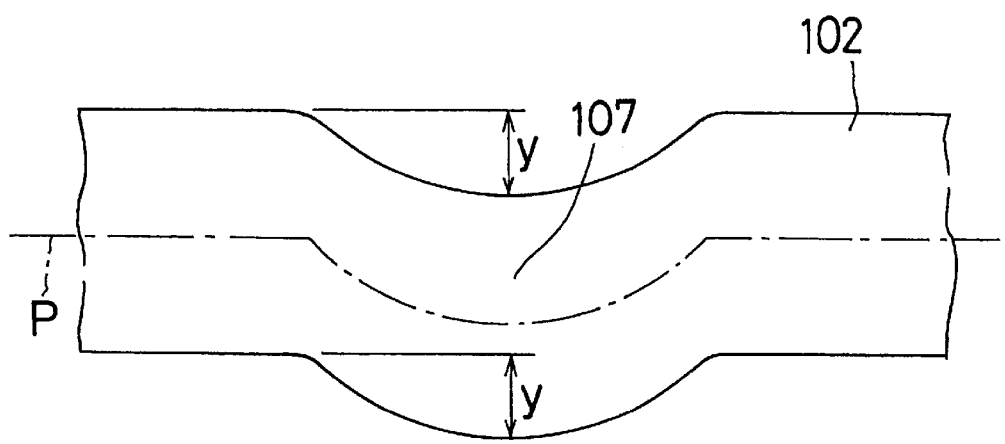
FIG. 6B is an enlarged front elevation of the member body shown in FIG. 6A, and in which the member body has undergone plastic working.
Figure 7A:
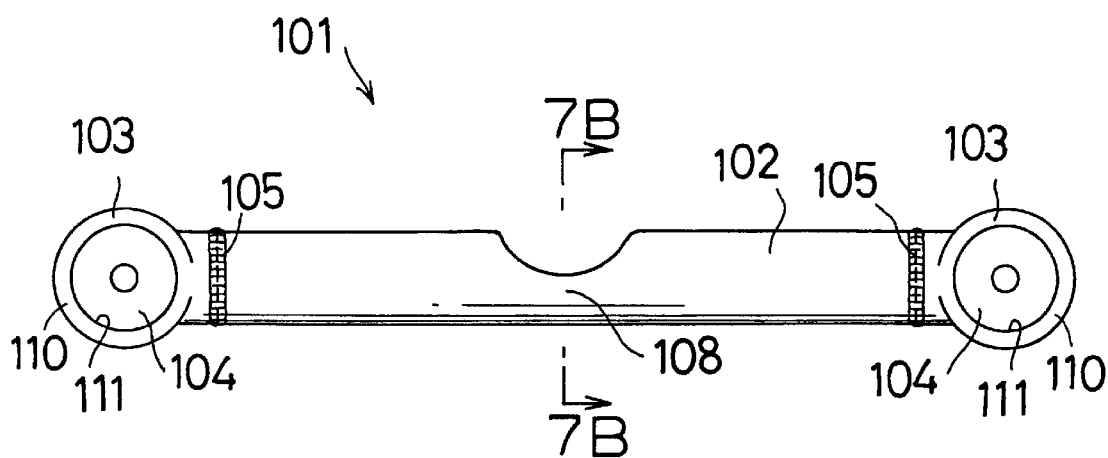
FIG. 7A is a front elevation of a member for use with an arm, the member being built in accordance with a third embodiment of the invention.
Figure 7B:
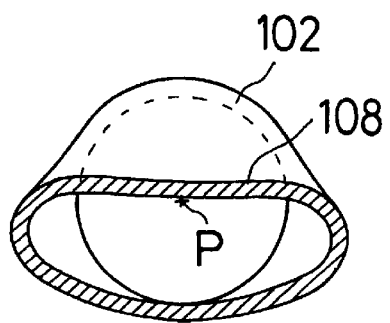
FIG. 7B is a cross-sectional view taken on line 7B—7B of FIG. 7A.

As shown in FIG. 6A, this bent portion 107 is formed by holding the curved wall in the longitudinal center of the member body 102 between a punch 121 having a shaping surface 121a of given shape and a receiving die 122 having a shaping recess 122a of given shape from a direction perpendicular to the axis P of the member body 102 and to the axes of the holding holes 111 in the bushing mounts 110. The held local portion is plastically deformed like the letter C while maintaining the horizontal cross-sectional shape and the dimensions of the curved wall of the member body 102. Holder dies 123 hold down the member body 102. In this figure, y indicates the amounts of bending of the bent portion 107 of the member body 102 receiving the pushing force of the punch 121. These amounts y are equal.

In this way, the substantially C-shaped bent portion 107, i.e., the local portion offset in axis P, is formed in the longitudinal center of the member body 102 by plastic working. Hence, the member body 102 easily buckles. Consequently, the member 101 for the arm can lessen the impact in a collision.

A third embodiment of the present invention is next described by referring to FIGS. 7A and 7B. Note that like components are indicated by like reference numerals in the first and third embodiments. In this third embodiment, an arc-shaped recess 108 is formed in one location of the curved wall of the member 101 by a plastic working operation using a punch (not shown) in the longitudinal center of the member body 102. Thus, the second moment of cross section about the axis parallel to the axes of the holes 111 holding the bushing mounts 110 is less than the second moments of cross section about other axes passing through the center of the figure. Axially offset portions are formed locally. The presence of the recess 108 facilitates buckling of the member body 102. Therefore, the member 101 for the arm can mitigate the impact in a collision.

In the first through third embodiments, the member 101 for the arm is characterized in that the curved wall of the plastically wrought member body 102 is simply recessed or bent; the area of the horizontal cross section of the curved wall hardly decreases after the plastic working. In consequence, the tensile strength of the member 101 for the arm in accordance with the any one of the first through third embodiments hardly decreases but rather assumes substantially the same value as the value taken prior to the plastic working. Accordingly, the member 101 for the arm can reduce the impact in a collision. Furthermore, it exhibits a high strength against a load applied in the tensile direction. Moreover, it is quite easy to perform the plastic working, since the member body 102 is made of a hollow tubular member.

If the member body 102 is made of a solid material (not shown), the longitudinally intermediate wall portion of the member body is crushed into a flat shape by plastic working such as press working and thus a crushed wall portion is formed in the member body in the longitudinal center of the member body. This crushed portion becomes a deformable portion of the member for the arm.

Figure 9:
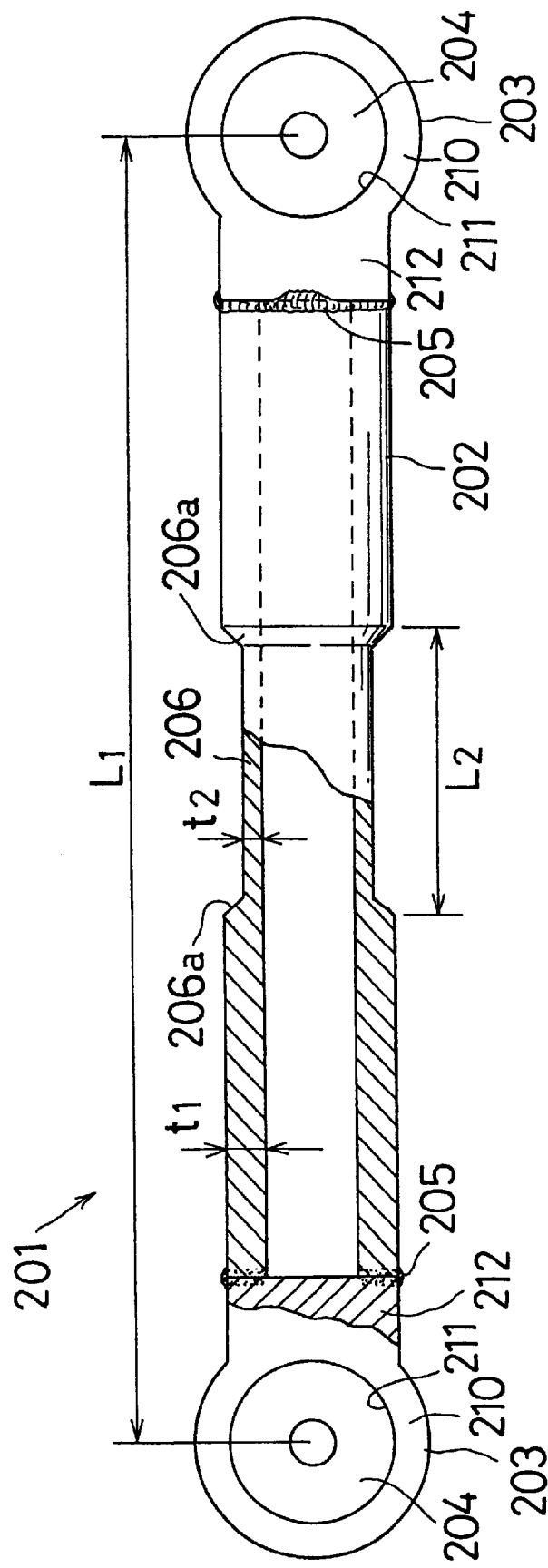
FIG. 9 is a partially cutaway plan view of the member shown in FIGS. 8A–8C.

A fourth embodiment of the invention is next described by referring to FIGS. 8A–11. As shown in FIGS. 8A–9, a member for use with an arm in accordance with the fourth embodiment of the invention is indicated by 201 and comprises a rodlike member body 202 having a given length, a pair of press-fit bushing mounts 210 formed at opposite ends of the body 202, and a pair of cylindrical anti-vibration bushings 204 made of rubber having resilience. The bushing mounts 210 having bushing-mounting members 203 are separate from the member body 202. The bushing mounts 210 are formed at the opposite ends of the member body 202 by joining the bushing mounts 210 to the opposite ends of the member body 202 by a well-known joining method. The bushing-mounting members 203 are joined to the body 202 at joints 205.

The member body 202 is fabricated, for example, by extruding an aluminum material into a hollow tubular member of circular cross section (e.g., JIS (Japanese Industrial Standards) A6061-T6 having a diameter of 25 mm and a thickness of 3 mm) and cutting the tubular member to a given length along a plane perpendicular to the direction of extrusion. A local thin-walled portion 206 is formed in the longitudinal center of the member body 202. This thin-walled portion 206 has a reduced wall thickness over the whole circumference of the curved wall of the member body 202. The thin-walled portion 206 will deform on application of an axial compressive load, and is fabricated by lathing the curved wall of the member body 202 over the whole circumference from the outer surface with a lathing tool (not shown). The outer surface of the thin-walled portion 206 is connected with the outer surfaces of both ends of the member body 202 via tapering surfaces 206a. Consequently, stress concentration is unlikely to occur on application of an axial tensile load on the member body 202. The tapering surfaces 206a can be rounded in a manner not illustrated. In FIG. 9, t1 indicates the wall thickness of the curved wall at both ends of the member body 202, and t2 indicates the wall thickness of the thin-walled portion 206.

In the bushing-mounting member 203, the circular bushing mount 210 having the circular bushing-holding hole 211 in which the bushing 204 is mounted with a press fit is integral with the pyramidal connecting protrusion 212 of square cross section protruding over the outer surface of the bushing mount 210. The bushing-mounting member 203 is manufactured by extruding an aluminum material (e.g., JIS A6061-T6) having a given cross-sectional shape and cutting the aluminum material into a slice having a given thickness along a plane perpendicular to the direction of extrusion. The bushings 204 are mounted with a press fit in the holding holes 211 in the bushing mounts 110. The length of one side of each end surface of the connecting protrusions 212 is set substantially equal to the outside diameter of the member body 202.

In the member 201 for the arm in accordance with the fourth embodiment, the distance L1 between the bushings 204 mounted with a press fit in the bushing-holding holes 211 in the bushing mounts 210 is 300 mm, for example. The length L2 of the thin-walled portion 206 formed in the member body 202 in the axial direction is 50 to 100 mm, for example. The wall thickness t1 of the hollow tubular member forming the member body 202 is 3 mm, for example. The wall thickness t2 of the thin-walled portion 206 is 0.3 to 1.5 mm, for example.

Figure 10:
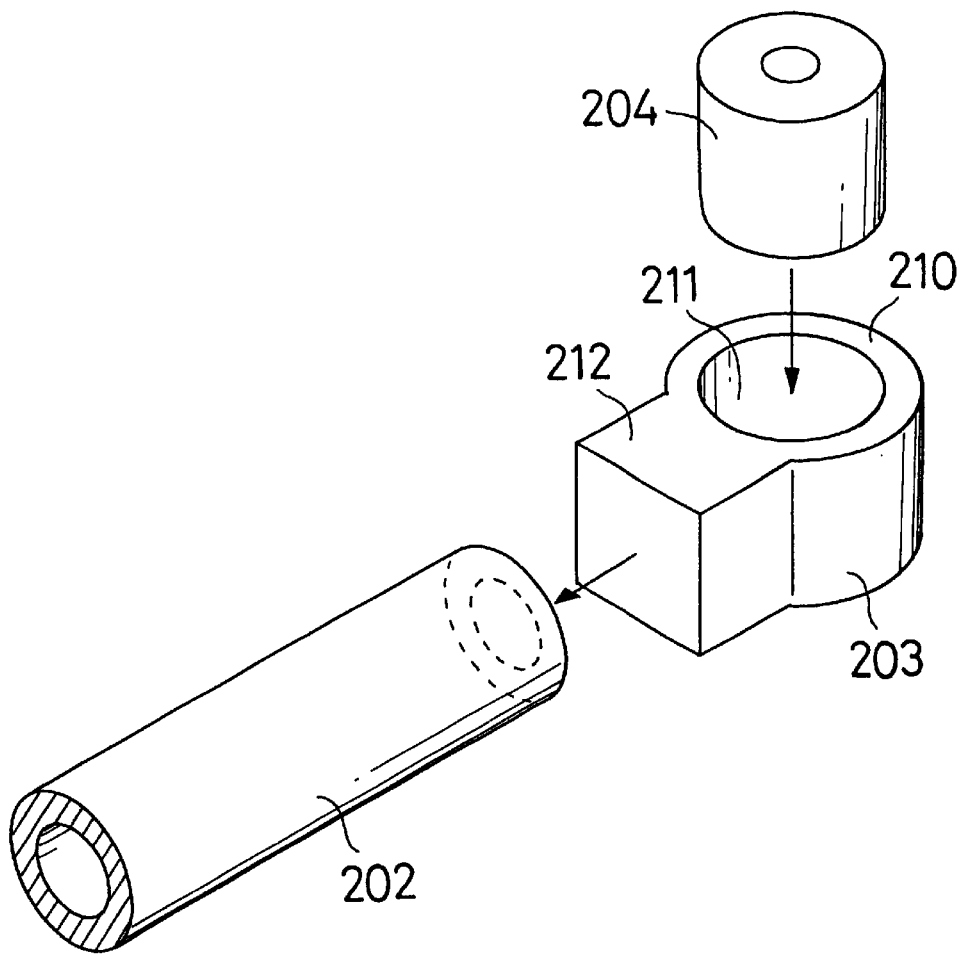
FIG. 10 is a perspective view of a member body, a bushing mount used as a joint, and a bushing.

The member 201 in accordance with the fourth embodiment is fabricated in a manner described below. As shown in FIG. 10, the bushing 204 is first mounted with a press fit into the holding hole 211 in the bushing mount 210 of the bushing-mounting member 203. The end surface of the connecting protrusion 212 of the bushing-mounting member 203 is made to abut against the end surface of the member body 202. The abutting surfaces are joined together over the whole circumference by a well-known joining method. In this way, the bushing-mounting members 203 are coupled to the member body 202.

Examples of the joining method include fusion welding, such as MIG, TIG, and laser welding processes, and non-fusion welding processes, such as friction stir welding and friction welding. Where friction stir welding is used as the aforementioned joining method, the resilient characteristics of the bushing 204 mounted in the holding hole 211 in the bushing mount 210 can be maintained well. Furthermore, the welding strength can be made high. In addition, the welding state can be made good.

Figure 11:
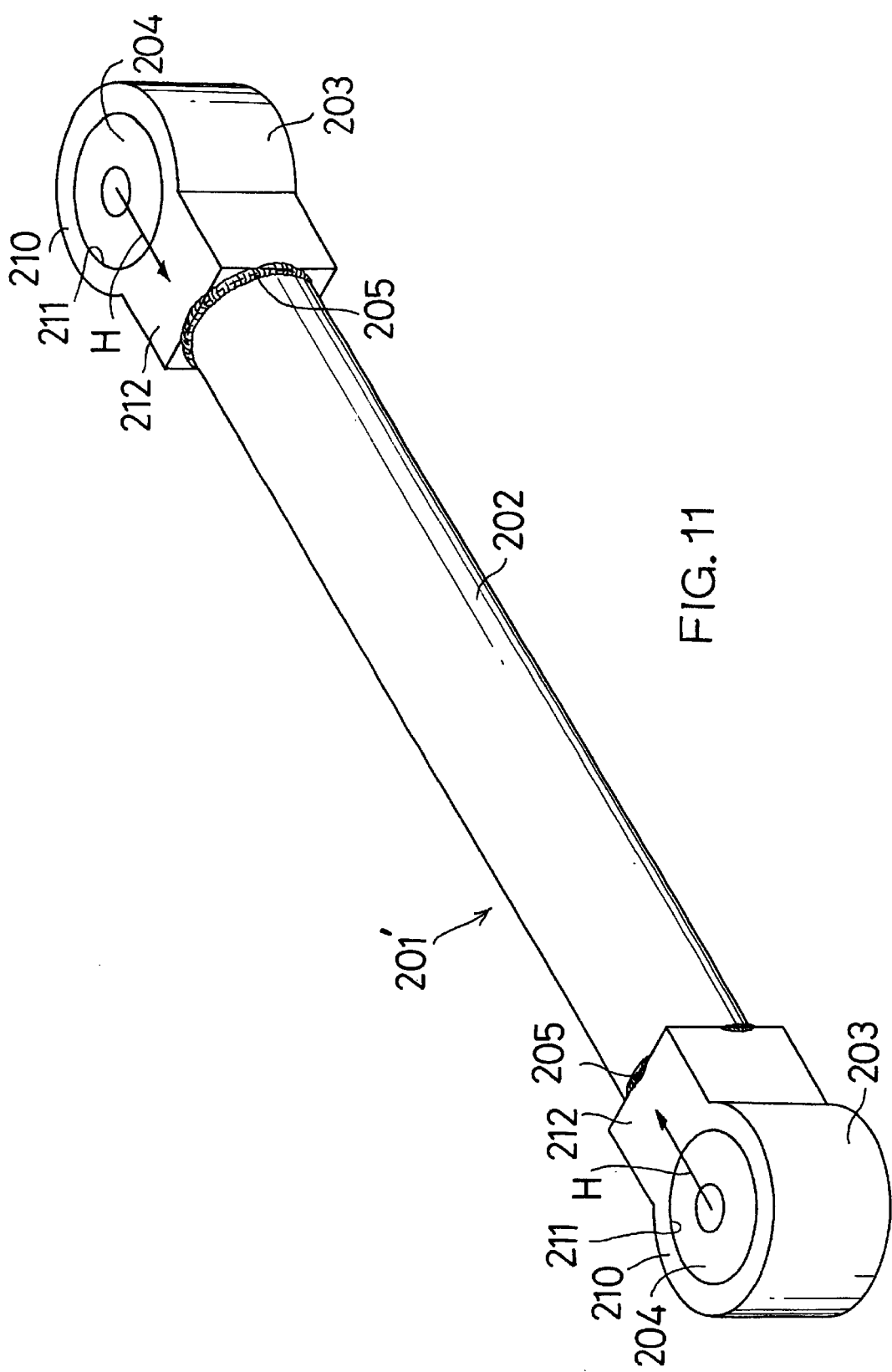
FIG. 11 is a perspective view of a member body not yet undergone a cutting operation.
Figure 14:
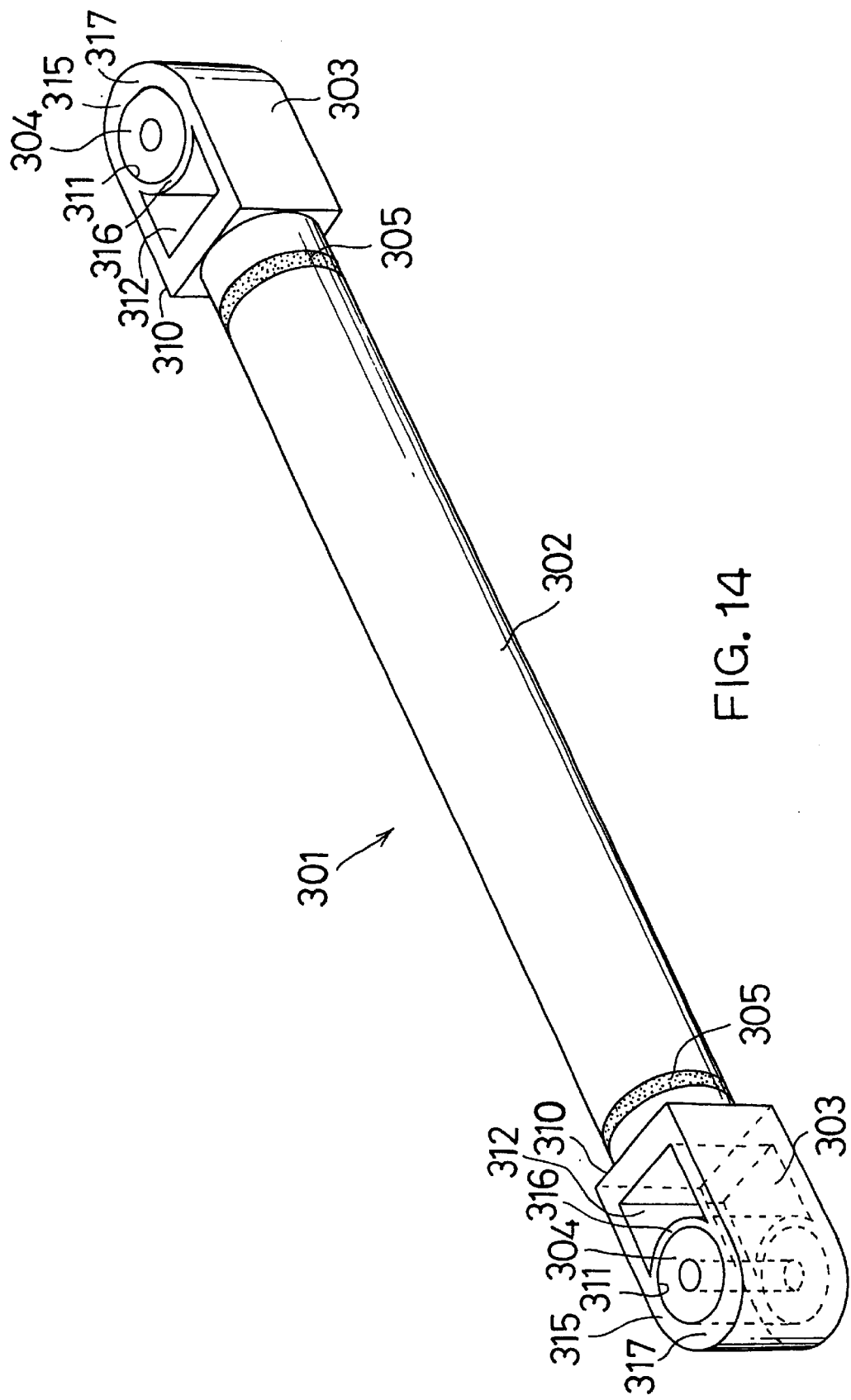
FIG. 14 is a perspective view of a member for use with an arm, the member being built in accordance with a sixth embodiment of the invention.

The resulting member, 201', for the arm is shown in FIG. 11. In this member 201', the bushing mounts 210 are joined to the member body 202 in such a way that the axes of the holding holes 211 in the mounts 210 are in the same direction and perpendicular to the axis of the member body 202. The joint 205 is formed over the whole circumference along the interface between the end surface of the connecting protrusion 212 of the bushing-mounting member 203 and the abutting surface of the member body 202.

The body 202 of the member 201' for the arm is made of a hollow tubular member of circular cross section. Therefore, the member 201' has high space factor and is lightweight. Since the member body 202 and the bushing-mounting member 203 are made of aluminum, the weight is reduced further. In addition, the member body 202' and the bushing-mounting members 203 are fabricated by an extrusion process and so the manufacturing efficiency can be enhanced. The cost can be curtailed further greatly. Accordingly, the member 201' for the arm is more economical to fabricate.

The member 201' for the arm shown in FIG. 11 is mounted to other automotive member via the bushings 204 mounted in the holding holes 211 formed in the bushing mounts 210. If the automobile collides, a load is applied to the bushings 204 in a direction (indicated by the arrow H) to bring them closer to each other. An axial compressive load is applied to the member body 202. However, if the axial compressive load is applied to the member body 202 of the member 201' for the arm, the body 202 is insusceptible to deformation such as buckling. Therefore, it is impossible to mitigate the impact in a collision.

In this fourth embodiment, a local thin-walled portion 206 is formed in the longitudinal center of the member body 202, as shown in FIGS. 8A–9 by cutting the curved wall in the longitudinal center of the member body 202. Thus, the thin-walled portion 206 of the member body 202 is more vulnerable to axial compressive loads than other portions. As a result, the member body 202 is shaped into a V-shaped form in the thin-walled portion 206. Hence, the body is more likely to buckle.

In this way, the local thin-walled portion 206 is formed in the longitudinal center of the member body 202 by a cutting operation. In consequence, the member body 202 is more likely to buckle. Hence, the member 201 for the arm can mitigate impact in a crash.

A fifth embodiment of the invention is next described by referring to FIGS. 12A–13B. Note that like components are indicated by like reference numerals in both fourth and fifth embodiments.

As shown in FIGS. 12A–12C, a member for an arm in accordance with the fifth embodiment is indicated by 201 and has a locally thin-walled portion 207 in the longitudinal center of the member body 202. This thin-walled portion 207 is formed by planing the curved wall of the member body 202 from a direction vertical to the axes of the holding holes 211 in the bushing mounts 210, using a planing tool (not shown). The outer surfaces of the both ends of the member body 202 are connected to the longitudinal both ends of the outer surface of the thin-walled portion 207 via inclined surfaces 207a. When an axial tensile load is applied to the member body 202, stress concentration is unlikely to occur. Consequently, generation of stress concentration can be prevented.

If an axial compressive load (in the direction indicated by the arrow J) is applied to the body 202 of the member 201 described above as shown in FIG. 13A, the member body 202 buckles about the thin-walled portion 207 and deforms into a V-shaped form. In this way, the body tends to buckle or break (as at 8). Hence, the member 201 for the arm can mitigate the impact in a crash.

This member 201 in accordance with this fifth embodiment is especially characterized in that the circumferentially extending thin-walled portion 207 is formed in the curved wall in the longitudinal center of the member body 202 and, therefore, the direction of deformation of the body 202 can be set. Therefore, where this member 201 for the arm is mounted to various frames of automobiles, if an object that might interfere with the member is present near the member, deformation such as buckling is possible without being hindered by the object. Consequently, this member 201 for the arm can reliably mitigate impact in a crash.

The members 201 in accordance with the fourth and fifth embodiments are partially cut out and thus the weight is reduced accordingly. Furthermore, the thin-walled portion 206 or 207 formed by the cutting operation is located in the longitudinal center of the member body 202 and so the joint efficiency of the joint 205 between the member body 202 and each bushing-mounting member 203 is the same as the value obtained before the formation of the thin-walled portion 206 or 207.

The body 202 of the member 201 for the arm in accordance with the fourth or fifth embodiment described above has a thin-walled portion 206 or 207 whose wall thickness is so set that the member buckles when it undergoes an axial compressive load in the range of from 13 to 27 kN, i.e., 1300 to 2800 kgf, and that the member neither breaks nor deforms when it undergoes an axial tensile load of more than 25 kN, i.e., 2600 kgr.

Additionally, the member 201 in accordance with the fourth or fifth embodiment yields the following advantages. Buckling or breakage necessary for mitigation of impact can be produced at the joint 205 between the member body 202 and the bushing-mounting member 203. In this case, however, the joint strength of the joint 205 varies widely among commercial products. Therefore, there exists a danger of inadvertently producing buckling or breakage. This is undesirable for quality control. In the member 201 for the arm in accordance with the fourth or fifth embodiment, deformation such as buckling takes place in the thin-walled portion 206 or 207 formed in the longitudinal center of the member body 202. The thin-walled portion 206 or 207 is formed by a cutting technique that can precisely set the amount of cut. Hence, the strength is almost uniform among the commercial products. Accordingly, it is unlikely that buckling or breakage inadvertently takes place. This can make uniform the quality. As a result, the member 201 can reliably mitigate impact.

The thin-walled portion 206 or 207 of the member 201 in accordance with the fourth or fifth embodiment is not formed by press working that produces springback. Rather, the thin-walled portion is formed by a cutting operation. In consequence, the thin-walled portion has quite high dimensional accuracy.

A sixth embodiment of the present invention is next described by referring to FIGS. 14–17B. A member for an arm in accordance with the sixth embodiment is indicated by 301 in FIG. 14 and comprises a rodlike body 302 having a given length, a pair of press-fit bushing mounts 310 formed at opposite ends of the body 302, and a pair of cylindrical anti-vibration bushings 304 consisting of rubber having resilience. The bushing mounts 310 are separate from the member body 302. Bushing-mounting members 303 having the bushing mounts 310 are friction stir welded to both ends of the member body 302 and formed at both ends.

The member body 302 is fabricated by extruding an aluminum material into a straight hollow tubular member of circular cross section and cutting the aluminum material along a plane perpendicular to the direction of extrusion, as shown in FIG. 15.

In the bushing-mounting member 303, the circular bushing mount 310 having the circular bushing-holding hole 311 in which the bushing 304 is mounted with a press fit is integral with the a connecting fitting portion 313 protruding over the outer surface of the bushing mount 310. The connecting fitting portion 303 is manufactured by extruding an aluminum material having a given cross-sectional shape, cutting the aluminum material into a slice having a given thickness along a plane crossing the direction of extrusion, and shaping the connecting fitting portion 313 into a cylinder by a cutting operation.

The connecting fitting portion 313 is set slightly larger than the inside diameter of the member body 302 and can be mounted with a press fit in the opening 302a at one end of the member body 302.

The diameter of the bushing-holding hole 311 in the bushing mount 310 is set slightly smaller than the outside diameter of the bushing 304 so that the bushing 304 can be mounted with a press fit in the bushing-mounting hole 311. A substantially rectangular space 312 having a width equal to or greater than the diameter of the bushing-holding hole 311 is formed in the bushing-holding hole 311 of the bushing mount 310 on the side of the member body 302 to permit movement of the bushing. A partition wall 316 that is curved into an arc in the direction of the width is formed between the holding hole 311 and the space 312. This partition wall 316 forms a part of the wall 315 around the bushing-holding hole 311. The partition wall 316 has a thinner wall than the other portion 317 of the curved wall 315.

The wall thickness of the partition wall 316 and the wall thickness of the portion 317 other than the partition wall 316 in the curved wall 315 around the bushing-holding hole 311 are set in relation to the load applied to the bushing 304 mounted with a press fit in the bushing-holding hole 311 as follows, for example. The wall thickness of the partition wall 316 is so set that it is not plastically deformed when a load under 1.3 tons (i.e., 1300 kgf) is applied and that it is plastically deformed in a desired manner when a load of 1.3 to 2.6 tons (i.e., 1300 to 2600 kgf) is applied. The wall thickness of the portion 317 other than the partition wall 316 in the wall 315 around the bushing-holding hole 311 is so set that it is not plastically deformed when the applied load is either under 2.6 tons (i.e., 2600 kgf) or in excess of 2.6 tons. In this way, inadvertent breakage or deformation is prevented.

A method of fabricating the member 301 for an arm in accordance with this sixth embodiment is described now. First, the bushing 304 is mounted with a press fit into the holding hole 311 in the bushing mount 310. Also, the connecting fitting portion 313 of the bushing mount 310 is forced into the opening 302a at one end of the member body 302.

Figure 16A:
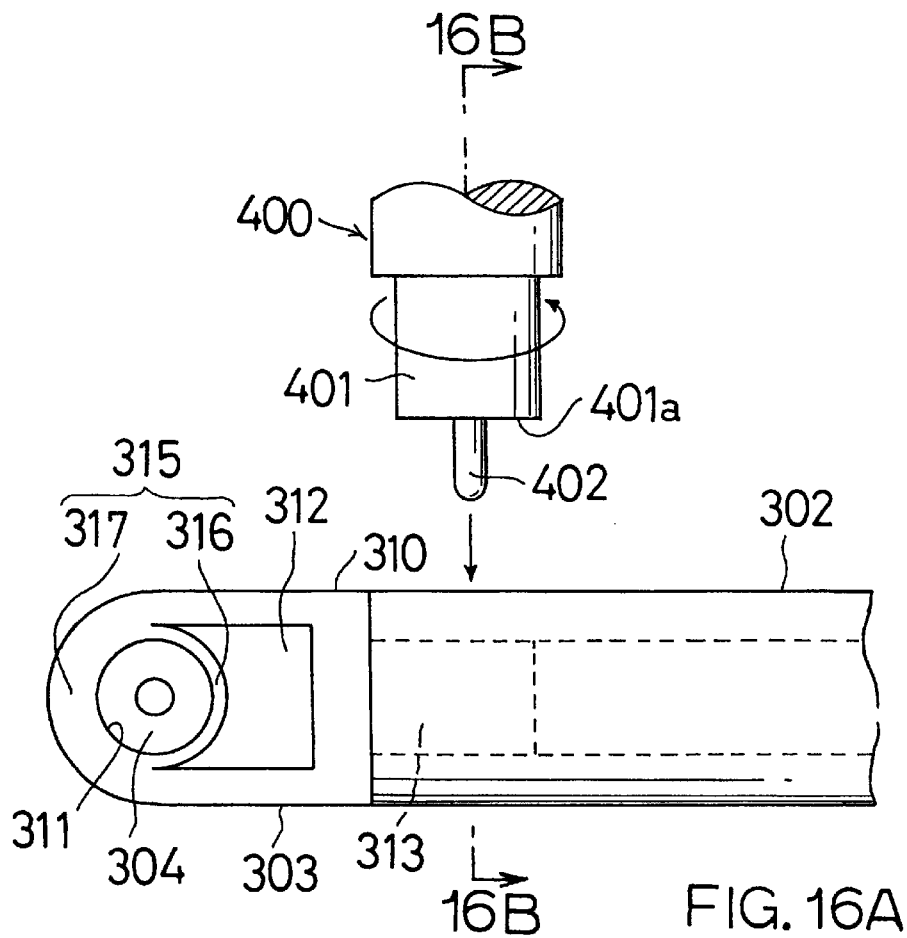
FIG. 16A is a perspective view of a member body, a bushing mount fitted in the member body, and a welding tool.
Figure 16B:
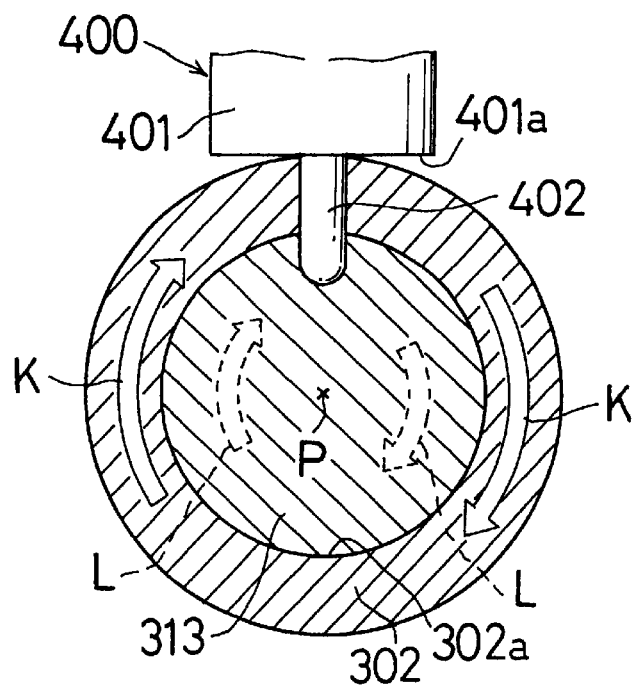
FIG. 16B is a cross-sectional view taken on line 16B—16B of FIG. 16A, and in which the probe of the welding tool is inserted in a fitting portion between the member body and the bushing mount.

Then, as shown in FIGS. 16A and 16B, the fitting portion of the connecting fitting portion 313 is circumferentially welded to the member body 302 by a well-known welding method. In consequence, the bushing-mounting member 303 and the member body 302 are welded together. The welding can be a fusion welding process such as MIG, TIG, and laser welding. Preferably, the welding is friction stir welding that is one kind of nonfusion welding process.

They are welded together by friction stir welding in the manner described below. The welding tool 400 having a larger cylindrical rotor 401 and a smaller pin-like probe 402 is prepared. The probe 402 protrudes along the axis of the end surface 401a of the rotor 401 so as to be rotatable with the rotor 401. Using the welding tool 400, the probe 402 is inserted from the outer surface of the member body 302 through the fitting portion between the connecting fitting portion 313 and the member body 302. Preferably, the insertion is done until the front end of the probe 402 goes beyond the wall thickness of the member body 302 and reaches the connecting protruding portion 313 and until the end surface 401a of the rotor 401 abuts against the outer surface of the member body 302, because this produces more frictional heat.

Then, the member body 302 and the bushing-mounting member 303 are rotated simultaneously about the center axis P of the member body 302. Since the connecting fitting portion 313 of the bushing-mounting member 303 is mounted with a press fit in the opening 302a in the member body 302, they are so connected together that if one of the body 302 and the bushing-mounting member 303 is driven rotationally, the other is rotated simultaneously. Therefore, the rotation operation can be performed simply by rotating one of the member body 302 and the bushing-mounting member 303. Hence, it is quite easy to perform the rotation operation.

In this sixth embodiment, it is assumed that the body 302 of the member is driven rotationally in the direction indicated by the arrow K. Thus, the bushing-mounting member 303 is rotated in the direction indicated by the arrow L.

After the probe 402 has been inserted in this way, the body 302 of the member is driven rotationally to friction stir weld the fitting portion circumferentially. Consequently, the member body 302 and the bushing-mounting member 303 are welded together.

In the resulting member 301 for the arm, the member body 302 consists of a hollow tubular member of circular cross section. Therefore, the space factor is high and the body is lightweight. Furthermore, the weight is reduced further, because the member body 302 and the bushing-mounting member 303 are made of aluminum.

Since they are welded together by a friction stir welding process that needs a less amount of heat introduced than fusion welding processes such as MIG, TIG, and laser welding, the rubber elastic member of the bushing 304 mounted in the bushing-holding hole 311 in the bushing mount 310 is hardly affected by heat. The resilient characteristics of the bushing 304 are maintained well. Furthermore, the weld strength of the joint 305 is neither deteriorated nor thermal distortion is produced. Hence, the joint strength is high and the joint state is good.

This member 301 for the arm is mounted to various frames via the bushing 304 mounted in the bushing-holding hole 311 of the bushing mount 310. If the automobile collides, the member deforms as follows to mitigate the impact.

Figure 17A:
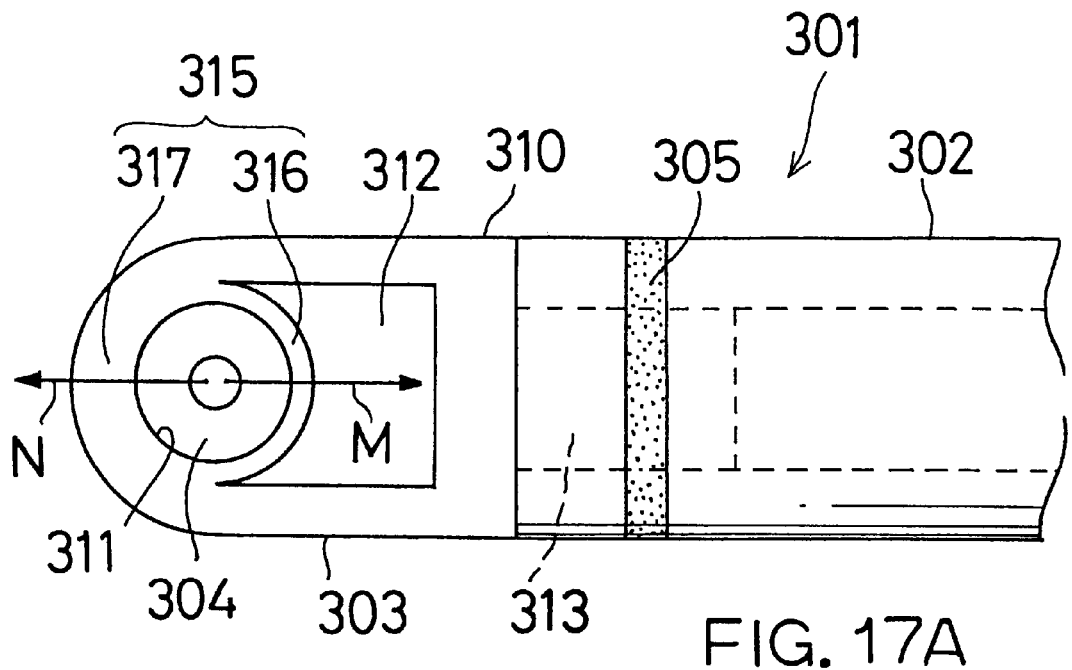
FIG. 17A is a plan view of a partition wall, and in which the wall is not yet deformed.
Figure 17B:
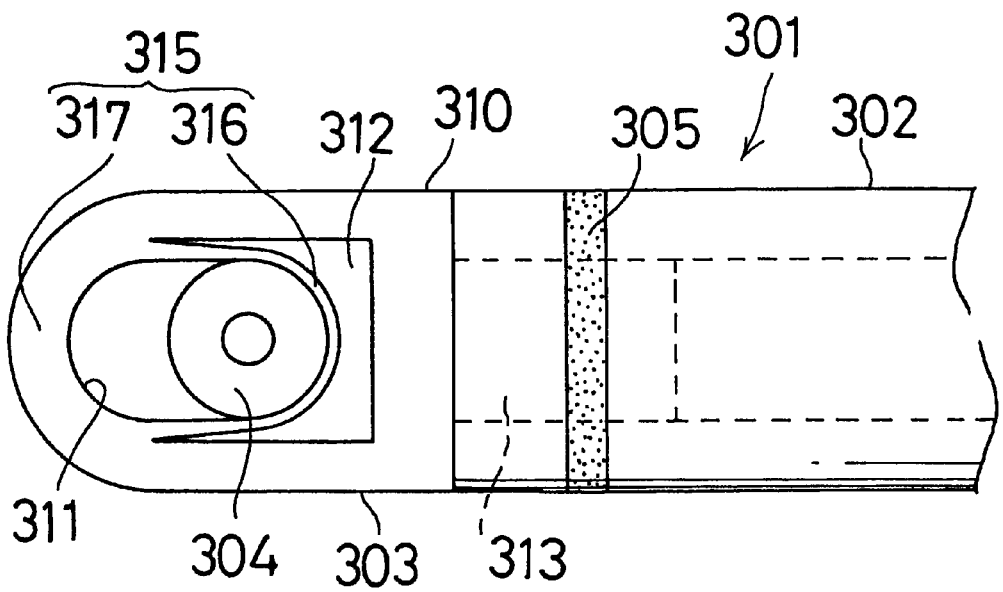
FIG. 17B is a plan view similar to FIG. 17A, but in which the partition wall has been deformed.
Figure 18:
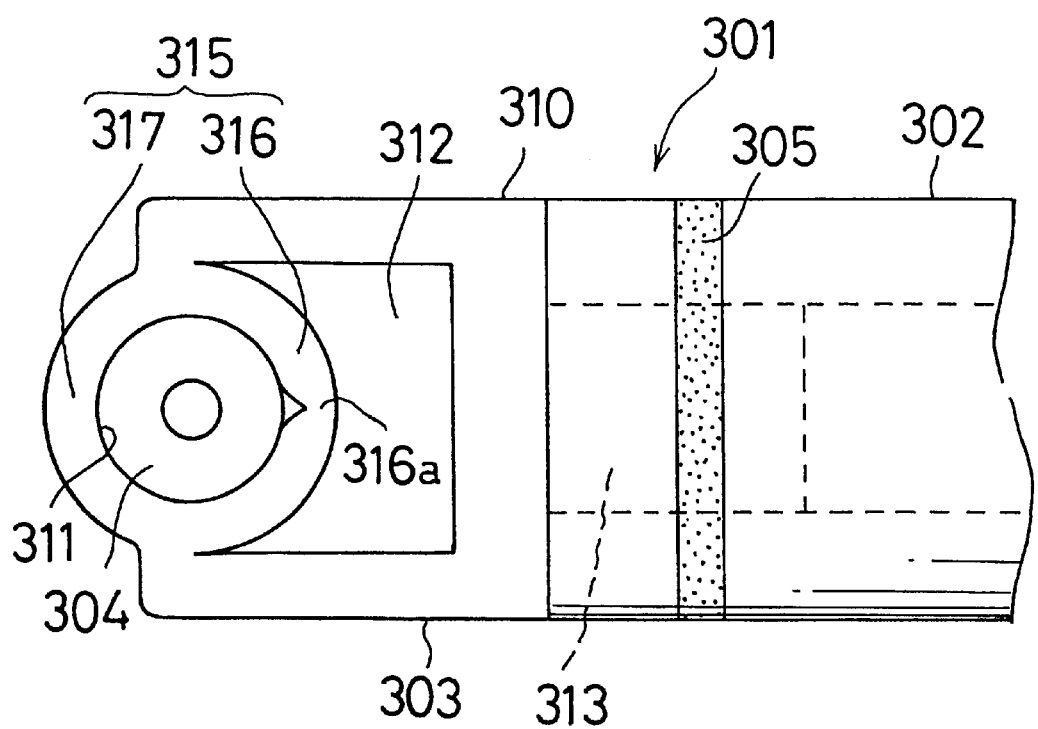
FIG. 18 is a plan view of a member for use with an arm, the member being built in accordance with a seventh embodiment of the invention.

When the automobile collides, a load is applied to the bushing 304 in the direction indicated by the arrow M, as shown in FIG. 17A. That is, an axial compressive load of, for example, 1.3 to 2.6 tons is applied to the member body 302. This moves the bushing 304 toward the member body 302. As mentioned previously, the space 312 is formed close to the bushing-holding hole 311 on the side of the member body 302 via the partition wall 316 to permit movement of the bushing. Therefore, the bushing 304 moves through the space 312 while plastically deforming the partition wall 316, as shown in FIG. 17B. The resulting plastic deformation of the partition wall 316 can mitigate the impact in a crash.

If a load is applied to each bushing 304 in a direction different from the direction of application of collisional load, e.g., in a direction (indicated by the arrow N) to move the bushings 304 away from each other, and if an axial tensile load is applied to the member body 2, the bushings 304 are firmly held by the portion 317 other than the partition wall 316 in the curved wall 315 around the bushing-holding hole 311. This prevents deformation and breakage of the member body 302 and the bushing mounts 310. Accordingly, the member 301 in accordance with the sixth embodiment is able to mitigate the impact in a crash. The member exhibits a high strength against a load applied in a direction different from the direction of application of the collisional load.

A seventh embodiment of the present invention is next described by referring to FIG. 18. Note that like components are denoted by like reference numerals in both sixth and seventh embodiments of the invention. The description given below will center on the difference between the sixth and seventh embodiments.

In the member 301 in accordance with the seventh embodiment, the partition wall 316 has the same wall thickness as the portion 317 other than the partition wall 316 in the curved wall 315 around the bushing-holding hole 311. A V-shaped groove is formed in the center of the inner surface of the partition wall 316, thus forming a local thin-walled portion 316a in the partition wall 316. This facilitates plastic deformation of the partition wall 316, assuring that impact is mitigated in a collision.

The prior art member body for the arm may be fabricated from a hollow tubular member of a ferrous material. Similarly, the member bodies in accordance with the first through seventh embodiments of the present invention are made of a hollow tubular member. Therefore, no design modifications are necessary, which is advantageous for the design. Furthermore, the hollow tubular material is made of aluminum and so the member is lighter than conventional.

While the first through seventh embodiments of the invention have been described, the invention is not limited thereto. Rather, various changes and modifications are possible. For instance, the bushing-mounting members 103, 203, and 303 can be die cast, molded, or forged from aluminum. Furthermore, the bushing-mounting members 103, 203, and 303 can be members that can be tightened by winding. In addition, the bushing-mounting members 103, 203, and 303 can be mechanically crimped to the member bodies 102, 202, and 302, respectively. Further, the bushing-holding holes 111, 211, and 311 can be directly formed as the bushing mounts 110, 210, and 310 at both ends of the member bodies 102, 202, and 302, respectively, without forming the bushing mounts 110, 210, and 310 as components separate from the member bodies 102, 202, and 302, respectively.

It is to be understood that the use of the member for an arm in accordance with the present invention is not limited to suspension arms. For example, the member may be used as an engine mount. The joint formed in a part of the member body can be a yoke or a ball joint, as well as a bushing mount.

EXAMPLES 4–6 AND COMPARATIVE EXAMPLE 1

An aluminum material JIS (Japanese Industrial Standards) A6063-T5 was extruded into a hollow tube ($\phi$22-t2) having a length of 300 mm to form the member body 102. Using this member body 102, three kinds of member (Examples 1–3) for arms in accordance with the first embodiment described above and having three different amounts of recess (x) were fabricated. Similarly, the same aluminum material JIS A6063-T5 was extruded into a hollow tube (φ22-t2) having a length of 300 mm to form the member body 102. Using this member body 102, three kinds of member (Examples 4–6) for arms in accordance with the second embodiment described above and having three different amounts of bending (y) were fabricated.

Meanwhile, an aluminum material JIS A6063-T5 was extruded into a hollow tube (φ22-t2) having a length of 300 mm to form the member body 102. Using this member body, a member (Comparative Example 1) for use with an arm and whose body 102 has not undergone plastic working was fabricated.

Then, with respect to the members according to Examples 1–6 and Comparative Example 1, buckling load and tensile strength were examined. The results are listed in Table 1.

TABLE 1

| | amount of recess x (mm) | amount of bending y (mm) | buckling load kgf) | tensile strength (kgf) | tensile strength-buckling load (kgf) |
|---|---|---|---|---|---|
| Example 1 | 2.5 | — | 2500 | 2980 | 480 |
| Example 2 | 5 | — | 2300 | 2940 | 640 |
| Example 3 | 10 | — | 2050 | 2900 | 850 |
| Example 4 | — | 5 | 2200 | 2860 | 660 |
| Example 5 | — | 10 | 1830 | 2630 | 800 |
| Example 6 | — | 20 | 1500 | 2550 | 1050 |
| Comparative Example 1 | 0 | 0 | 3050 | 3200 | 150 |

As shown in Table 1, the buckling load decreases with increasing the amount of recess (x) and with increasing the amount of bending (y). It is observed that the amount of decrease in the buckling load is much greater than the amount of decrease in the tensile strength. That is, where plastic working involving almost no decrease in the horizontal cross-sectional area is used, the buckling load can be reduced while suppressing the decrease in the tensile strength. Therefore, the members used for arms and built in accordance with Examples 1–6 buckle easily. In addition, they exhibit high strengths against loads in tensile directions.

As described above, a member that is built in accordance with the present invention and for use with an arm mounted in an automobile has a rodlike body made of a metal. A joint is formed in a part of this body of the member. The member has a deformable portion that permits the member to deform easily when an axial compressive load is applied. When the vehicle such as an automobile having the arm collides, an axial compressive load deforms the deformable portion in the member. Because of this deformation, impact can be mitigated in the collision.

Where the deformable portion is a local portion located in the longitudinal center of the member body and formed by crushing a wall portion of the member body, an axial compressive load buckles the crushed wall portion of the body of the member for use with the arm. The buckling mitigates the impact in a crash.

If the body of the member consists of a hollow tube, and if the deformable portion is a locally recessed portion of the curved wall of the hollow tube and located in the longitudinal center of the member body, the axial compressive load buckles the member body at the recessed portion. This buckling mitigates the impact in a crash. Furthermore, the member body is light, because it is made of a hollow tube.

Where the hollow tube is of circular cross section, dead space is unlikely to occur. Hence, the space factor is high.

Where the hollow tube is made by extrusion, the member body can be fabricated efficiently and at low cost.

Where the aforementioned deformable portion is an axially offset portion locally formed in the longitudinal center of the member body, an axial compressive load buckles the member body at the axially offset portion. The buckling mitigates the impact in a crash.

Where the deformable portion is a thin-walled portion locally formed in the longitudinal center of the member body, an axial compressive load buckles the member body at the thin-walled portion. This buckling mitigates the impact in a crash.

Where the thin-walled portion is fabricated by a cutting process, the member for use with the arm can be fabricated with high dimensional accuracy.

Where the thin-walled portion extends circumferentially of the member body, the direction of deformation of the member body can be set.

Where the joint is a bushing mount having a bushing-holding hole in which a bushing is fitly held, and where the deformable portion is formed near the bushing-holding hole via a partition wall, if the bushing fitly held in the bushing-holding hole is a space to permit the bushing to move while plastically deforming the partition wall, then an axial compressive load causes the bushing to move into the space while plastically deforming the partition wall. The plastic deformation of the partition wall mitigates the impact in a crash.

Where the partition wall has a thinner wall thickness than the other portions of the curved wall around the bushing-holding hole, the partition wall easily deforms plastically. This assures that impact is reduced in a crash.

Where a thick-walled portion is formed in a part of the partition wall, the partition wall similarly deforms plastically easily. Therefore, it is assured that impact is mitigated in a crash.

Where the member body is made of aluminum or an aluminum alloy, a lightweight member for use with an arm can be obtained. Where the joint described above is made of aluminum or an aluminum alloy, a lightweight member for use with an arm can be derived.

This application claims priority to Japanese Patent Applications Nos. H10(1998)-63161 filed on Mar. 13, 1998, H10(1998)-72591 filed on Mar. 20, 1998 and H10(1998)-75883 filed on Mar. 24, 1998, each disclosure of which is incorporated by reference in its entirety.

It will be understood that the terminology and description used herein are employed to explain only some preferred embodiments of the present invention and that the invention is not limited to them. Rather, various changes and modifications are possible within the scope of the appended claims.

What is claimed is:

1. A member for use with an arm, said member comprising:

a rodlike body made of a metal;

a joint formed in a part of said rodlike body;

a deformable portion that permits the member to deform easily when an axial compressive load is applied;

said joint being a bushing mount having a bushing-mounting hole in which a bushing is mounted with a press fit, and wherein said deformable portion is a space formed near said bushing-holding hole and located on the opposite side of a partition wall from said bushing-holding hole to permit the bushing held in said bushing-holding hole to move while plastically deforming said partition wall, said partition wall being thinner than portions of a wall, other than the partition wall, around said bushing-holding hole.

2. The member of claim 1, wherein said deformable portion is formed only around the longitudinal center of said rodlike body and fabricated by crushing a part of wall of said rodlike body.

3. The member of claim 2, wherein said deformable portion has been fabricated by plastic working.

4. The member of claim 1, wherein said rodlike body consists of a hollow tube formed by curved wall, and wherein said deformable portion is located in a longitudinally central portion of said rodlike body and formed by recessing a part of the curved wall.

5. The member of claim 4, wherein said deformable portion has been fabricated by plastic working.

6. The member of claim 4, wherein said hollow tube is of circular cross section.

7. The member of claim 4, wherein said hollow tube has been fabricated by extrusion.

8. The member of claim 1, wherein said deformable portion is an axially offset portion located in a longitudinally intermediate portion of said rodlike body.

9. The member of claim 8, wherein said deformable portion has been fabricated by plastic working.

10. The member of claim 8, wherein said rodlike body consists of a hollow tube.

11. The member of claim 10, wherein said hollow tube is of circular cross section.

12. The member of claim 10, wherein said hollow tube has been fabricated by extrusion.

13. The member of claim 1, wherein said deformable portion is a thin-walled portion locally formed in a longitudinally intermediate portion of said rodlike body.

14. The member of claim 13, wherein said thin-walled portion has been formed by a cutting operation.

15. The member of claim 13, wherein said thin-walled portion is formed over the whole circumference of the member.

16. The member of claim 13, wherein said thin-walled portion extends circumferentially partially.

17. The member of claim 13, wherein said rodlike body consists of a hollow tube.

18. The member of claim 17, wherein said hollow tube is of circular cross section.

19. The member of claim 17, wherein said hollow tube has been fabricated by extrusion.

20. The member of claim 1, wherein said partition wall has a local thin-walled portion.

21. The member of claim 1, wherein said rodlike body consists of a hollow tube.

22. The member of claim 21, wherein said hollow tube is of circular cross section.

23. The member of claim 21, wherein said hollow tube has been fabricated by extrusion.

24. The member of claim 1, wherein said rodlike body is made of aluminum or an aluminum alloy.

25. The member of claim 1, wherein said joint is made of aluminum or an aluminum alloy.

* * * * *